US012380471B2

(12) United States Patent
Snyder

(10) Patent No.: US 12,380,471 B2
(45) Date of Patent: Aug. 5, 2025

(54) STORY-BASED, MULTI-SCREEN ADVERTISING FRAMEWORK

(71) Applicant: A.D.Objects, Inc., Vancouver (CA)

(72) Inventor: Matthew Snyder, New York, NY (US)

(73) Assignee: ADObjects, Inc., Vancouver (CA)

( * ) Notice: Subject to any disclaimer, the term of this patent is extended or adjusted under 35 U.S.C. 154(b) by 0 days.

(21) Appl. No.: 14/063,685

(22) Filed: Oct. 25, 2013

(65) Prior Publication Data

US 2014/0122255 A1    May 1, 2014

Related U.S. Application Data

(63) Continuation-in-part of application No. 13/668,336, filed on Nov. 5, 2012, now abandoned.

(60) Provisional application No. 61/718,187, filed on Oct. 25, 2012, provisional application No. 61/555,111, filed on Nov. 3, 2011.

(51) Int. Cl.
G06Q 30/02      (2023.01)
G06Q 30/0241    (2023.01)

(52) U.S. Cl.
CPC ................ *G06Q 30/0276* (2013.01)

(58) Field of Classification Search
CPC .......... G06Q 30/0244; G06Q 30/0257; G06Q 30/0267; G06Q 30/0269; G06Q 30/0276
USPC .......................................................... 705/14
See application file for complete search history.

(56) References Cited

U.S. PATENT DOCUMENTS

| | | | |
|---|---|---|---|
| 6,226,692 B1 * | 5/2001 | Miloushev | G06F 8/36 719/316 |
| 8,190,460 B1 * | 5/2012 | Andersen et al. | 705/7.12 |
| 8,655,716 B1 * | 2/2014 | Barnes | G06Q 30/0241 705/14.49 |
| 8,832,559 B2 | 9/2014 | Mentchoukov et al. | |
| 8,881,033 B2 | 11/2014 | Mentchoukov et al. | |
| 9,575,934 B2 | 2/2017 | Mentchoukov et al. | |
| 2002/0013943 A1 * | 1/2002 | Haberman | G11B 27/031 725/39 |

(Continued)

OTHER PUBLICATIONS

Stack Overflow, Tag Info About User Agent, Internet Archive Way Back Machine Capture date of Nov. 24, 2011 from URL https://stackoverflow.com/tags/user-agent/info, Internet Archive Way Back Machine.*

(Continued)

*Primary Examiner* — James M Detweiler
(74) *Attorney, Agent, or Firm* — Dentons US LLP

(57) ABSTRACT

A responsive advertising system is described herein that provides an advertising solution for responsive, multi-screen website design. The system allows an advertisement to change based on events, actions of the user, or other criteria that the advertiser specifies, such that the actual content of the advertisement evolves in a kind of story line. If a user first accesses a website with an embedded advertisement on the user's desktop computer, the user may see a first version of the advertisement. If the user accesses the site again from the user's smartphone or other mobile device, then the system can serve a different version of the advertisement. Thus, the system provides an advertisement authoring and serving platform that allows for the creation of a new type of highly responsive advertisement that changes over time and across devices to tell a cohesive story and does so in a unified advertising unit format.

18 Claims, 29 Drawing Sheets

(56) References Cited

U.S. PATENT DOCUMENTS

| | | | |
|---|---|---|---|
| 2002/0112033 A1* | 8/2002 | Doemling | G06F 17/2247 709/219 |
| 2002/0133700 A1* | 9/2002 | Maurin | H04L 63/0823 713/156 |
| 2003/0028432 A1* | 2/2003 | Troyansky et al. | 705/14 |
| 2003/0229542 A1* | 12/2003 | Morrisroe | G06Q 30/0269 705/14.66 |
| 2004/0003400 A1* | 1/2004 | Carney et al. | 725/42 |
| 2005/0096980 A1 | 5/2005 | Koningstein | |
| 2005/0144073 A1* | 6/2005 | Morrisroe | G06Q 30/0255 705/14.5 |
| 2006/0069612 A1* | 3/2006 | Hurt | G06Q 30/0269 705/14.66 |
| 2006/0111971 A1 | 5/2006 | Salesin | |
| 2007/0061245 A1* | 3/2007 | Ramer et al. | 705/37 |
| 2007/0135099 A1* | 6/2007 | Taylor | G06F 16/958 455/412.1 |
| 2008/0097844 A1* | 4/2008 | Hsu | G06Q 30/0225 705/14.3 |
| 2008/0119132 A1* | 5/2008 | Rao | 455/3.04 |
| 2008/0177603 A1* | 7/2008 | Muthugopalakrishnan | G06Q 30/02 705/14.26 |
| 2009/0171920 A1 | 7/2009 | Wade | |
| 2009/0182841 A1* | 7/2009 | Caruso | G06Q 30/0264 709/218 |
| 2009/0197581 A1* | 8/2009 | Gupta | G06Q 30/02 455/414.2 |
| 2010/0049608 A1* | 2/2010 | Grossman | 705/14.55 |
| 2010/0114706 A1* | 5/2010 | Kosuru | G06Q 30/02 705/14.55 |
| 2010/0199197 A1* | 8/2010 | Faletski et al. | 715/760 |
| 2010/0293602 A1 | 11/2010 | Uchida | |
| 2011/0022464 A1* | 1/2011 | Dunn | G06Q 30/0255 705/14.52 |
| 2011/0151837 A1* | 6/2011 | Winbush, III | H04L 67/1095 455/412.1 |
| 2011/0231265 A1* | 9/2011 | Brown | G06Q 30/0277 705/14.73 |
| 2011/0320956 A1* | 12/2011 | Singh | G06Q 30/0241 715/747 |
| 2012/0059696 A1* | 3/2012 | Theberge et al. | 705/14.4 |
| 2013/0117127 A1* | 5/2013 | Sosiak | G06Q 30/0241 705/14.66 |
| 2013/0238449 A1* | 9/2013 | Ferreira | G06Q 30/00 705/14.72 |
| 2013/0263178 A1* | 10/2013 | Dow et al. | 725/32 |
| 2014/0052546 A1* | 2/2014 | Phan | G06Q 30/0277 705/14.72 |
| 2014/0095328 A1* | 4/2014 | Forouzandeh | G06Q 30/0277 705/14.73 |

OTHER PUBLICATIONS

Wikipedia, User Agent, Internet Archive Capture Date of Sep. 25, 2011, Internet Archive Way Back Capture Machine (Year: 2011).*

Electronic Frontier Foundation, Browser Versions Cary 10.5 Bits of Identifying Information on Average, Internet Archive Capture date of Jan. 30, 2010, Internet Archive Way Back Capture Machine (Year: 2010).*

"Responsive Design and Ad Creative an IAB Perspective" (a report prepared by the IAB Mobile Marketing Center of Excellence—Sep. 2012) (Year: 2012).*

"Responsive Desgin and Ad Creative an IAB Perspective" (a report prepared by the IAB Mobile Marketing Center of Excellence—Sep. 2012) (Year: 2012).*

Lightner, How to set up dual monitors in Window 7, Jul. 13, 2011, https://www.cnet.com/tech/computing/how-to-set-up-dual-monitors-in-windows-?/, pp. 1-4) (Year: 2011).

Marcotte, Fluid Grids, Mar. 3, 2009, https://alistapart.com/article/fluidgrids/, pp. 1-27 (Year: 2009).

Marcotte, Responsive Web Design, May 25, 2010, https://alistapart.com/article/responsive-web-design/, pp. 1-15 (Year: 2010).

* cited by examiner

FIG. 6

STORY-BASED, MULTI-SCREEN ADVERTISING FRAMEWORK

CROSS-REFERENCE TO RELATED APPLICATIONS

This patent application claims priority to U.S. Provisional Patent Application No. 61/718,187 filed 25 Oct. 2012, which is herby incorporated by reference in its entirety.

This patent application is a Continuation-in-Part of U.S. patent application Ser. No. 13/668,336 filed 5 Nov. 2012, now abandoned; which claims the benefit of U.S. Provisional Patent Application No. 61/555,111 filed 3 Nov. 2011; each of which is incorporated herein by reference for all purposes.

BACKGROUND

The market for mobile, online, and tablets is converging very rapidly with web tool evolution around Cascading Style Sheets version 3 (CSS3), Hypertext Markup Language version 5 (HTML5), and JavaScript technologies giving lots of opportunity for integrated designs. In May 2010, Ethan Marcotte (author of a book about adaptive, flexible grid-based web design) coined the phrase "Responsive Web Design" as a method of having the same web page adapt to different sizes based on browser widths used by clients to view the web page. This methodology makes it easier to keep the exact same web site content and have it display for multiple different views.

In parallel to this trend, digital advertisement formats have also evolved as well as the serving and other technologies that surround them. However, solutions have been consistent for any given view. Advertisement unit footprints have been fixed as a position in the website, such as ad slots, with new innovative techniques for delivering, tracking, and verifying as the evolutionary driver that has emerged with HTML5 web tools in general. The massive innovation around advertisement technology for online websites, versus the innovation for mobile advertisement technology has been totally separated in the industry. Different companies focusing on the different channel of online or mobile has been the status-quo. Mobile advertising has been thought of as a way to monetize mobile websites or applications with new units and development platforms. Many of the mobile technology companies have shown mobile to be something different that involved a separate technology and strategy. Examples of this can be found with the many rich media mobile advertisement units that have also evolved in HTML5.

In a recent report by Google (http://www.iptv-news.com/2012/08/google-90-of-us-consumers-shifting-between-screens/), they described the act of users moving from device to device as screen shifting. They stated that 90% of users shift from screen to screen given the state of smartphones today. However, advertisements do not respond well to this model. Advertisements are typically individually targeted to each device, form factor, or screen size. For authors of online advertisements and managers of online advertisement campaigns, reaching users on whatever devices they use can mean managing a large number of separate campaigns.

BRIEF DESCRIPTION OF THE DRAWINGS

FIG. 6 illustrates several different flow lines that have been created for demonstration purposes.

DETAILED DESCRIPTION

Figure 1:
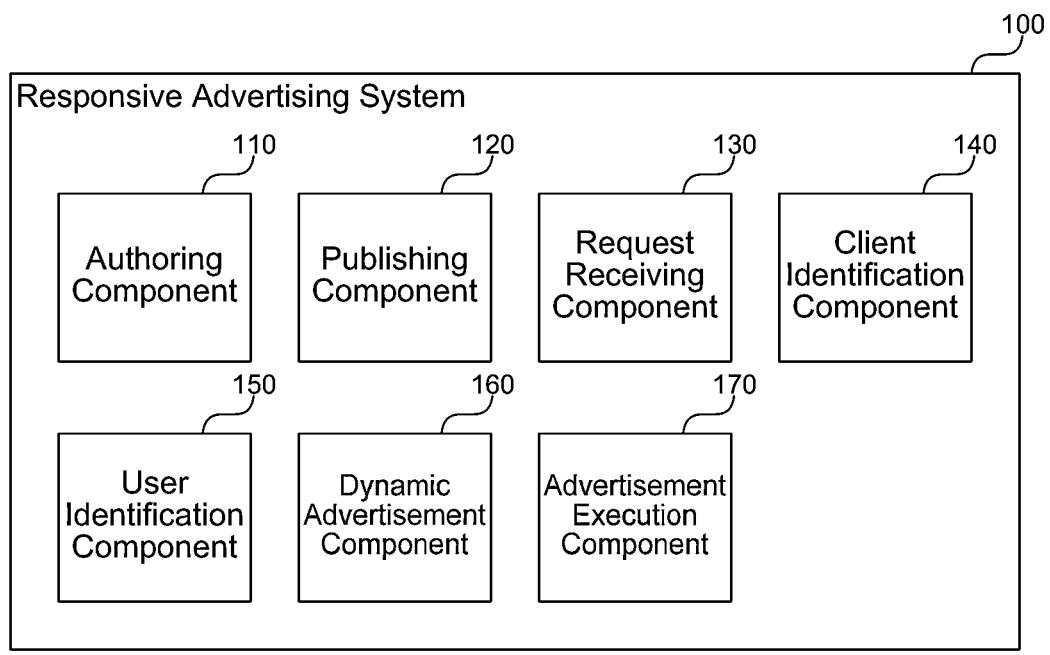
FIG. 1 is a block diagram that illustrates components of the responsive advertising system, in one embodiment.

A responsive advertising system is described herein that provides an advertising solution for responsive, multi-screen website design. The system also allows an advertisement to change based on events, actions of the user, or other criteria that the advertiser specifies, such that the actual content of the advertisement evolves in a kind of story line. If a user first accesses a website with an embedded advertisement on the user's desktop computer, the user may see a first version of the advertisement. For example, the advertisement might be for a retailer and the content of the advertisement might be designed to entice the user to visit the retailer. If the user accesses the site again, this time from the user's smartphone or other mobile device, perhaps from outside the store, then the system can serve a different version of the advertisement designed to bring the user in for a purchase. For example, the advertisement content might change to include a coupon that the user can use to buy the item in the store. In doing so, the system has responded to various events, such as the user changing screens/devices, changing location, and so forth, to inform the content of a single advertisement unit.

From the authoring side, the responsive advertising system provides a powerful platform through which advertisers can publish creative advertisements with various responsive components. The system is powerful enough that advertisements created through the system are applications unto themselves. These can be HTML5 elements, image elements, ADOBE™ FLASH™, or other types of applications incorporated in the ad and may be embedded in websites or other locations where advertisements are published. The responsive advertising system provides an authoring tool through which advertisers can specify various layouts and content for a single advertising unit, as well as conditions and criteria under which the advertisement content will change. For example, the advertiser might specify how a particular advertisement will look on a desktop computer, on a laptop, on a smartphone, on a tablet, on a smart watch, or other screen as well as elements of the advertisement that may change to respond to changing events and conditions, such as the user's viewability (sequencing) location, previous actions, time of day, store promotions, or other criteria relevant to the advertiser. Thus, the responsive advertising system provides an advertisement authoring and serving platform that allows for the creation of a new type of highly responsive advertisement that changes over time and across devices to tell a cohesive story and does so in a unified advertising unit format that does not ask advertisers to manage numerous advertising campaigns.

The system described herein can also work with non-responsive sites, with the one-advertising-third party tag solution deployed in each of the different channels. Therefore, even though one approach for the responsive advertising system might be for a responsive site as it would be very efficient to have one-third party advertising tag for one-responsive site, other approaches can be applied with the system as well. As multi-screen content delivery has been a hot topic for publishers and advertisers to have a flexible solution to meet the needs of the different screen formats of the marketplace today, alignment with the growth of social media and mobile has been highly relevant to be able extend existing advertising strategies from desktop to tablet and mobile.

The responsive advertising system provides a trans-media adaption of content from screen to screen, creating a story line (sequencing or dynamic content to follow a course of action related to influence a consumer step-by-step) over time from the marketer to the consumer. Thus, the responsive advertising system provides better engagement between advertiser and end user, regardless of the screen size or format, in a story-like form (i.e., user see's ads on one size screen, then sees them on another) and provides associated revenue opportunities for both publishers and advertisers for multi-screen ad content delivery. One way of looking at this is the ability to have a cross-screen attribution model where the actual conversions of the business objective can be aggregated from view-to-view of the website(s).

Behavioral retargeting (or simply retargeting) refers to online advertising that is targeted to consumers based on their previous actions, especially in situations where these actions did not result in a sale. The responsive advertising system provides a powerful platform for retargeting as advertisements can evolve over time based on a particular user's present situation with respect to a product. As a user moves further from or closer to a purchase, the advertisement can change in ways designed by an advertisement author to bring the user closer to a purchase.

Any mention of third party brands herein, such as Salesforce, may include trademarks and associated copyrights by their respective owners. All advertising examples are only examples to show the capabilities of the system and should not be assumed or construed to indicate that there is a business relationship with the advertiser.

The following terms are used throughout this document.

Third party tags. Advertiser ad tags that hold the ad creative. The tags respond to different ad unit sizes and shapes by changing either to swap ad or stretch ad configurations to effectively fit that space.

First party tags. Ad unit tags that are generated by typical ad servers such as Dart for Publishers (DFP). These tags go into a site to the positions (ad slots) where ads are served.

Ad footprint. This is the shape of the ad in any given scenario for screen size. Ad footprints can be set-up based on the ad slot configurations. Footprints can be fixed, proportional aspect ratio, and so forth.

Ad slot. A place on the responsive web site HTML where publishers insert a 1st party tags (e.g., inside of a leaderboard wrapper <div> HTML tag).

Creative. An ad unit that can be Flash, image file (GIF, JPEG, PNG), HTML5 code, or other.

Flow line. The way a footprint changes shape or the way the ad changes shape and size in a responsive layout. There are different ways to describe Flow lines, such as Linear, Accordion, Custom (there are proprietary responsive ad formats created by author) as well as methods to describe how an ad will act based on media queries and responsive web design. The Flow line will also contain story-line communications for different delivery scenario's as well as context directed at end-users or segments. Related products are sometimes delivered under the FLOW-LINE™ trademark.

Media queries. The standard in responsive web design for breakpoints of the different forms of the user interface of the web site from desktop, tablet, or mobile.

Stretch ad. This ad footprint is fluid, liquid and can change size with one ad creative HTML asset. Depending on the flow line, an ad footprint can take any form. Related products are sometimes delivered under the STRETCH™ trademark.

Swap ad. This ad footprint has different creatives that change depending on the different break points of media queries in responsive web design. Related products are sometimes delivered under the SWAP™ trademark.

Story line. This is the transitional experience of a user as they engage an ad from one screen to the next. Attribution models can be built from this storyline experience. Related products are sometimes delivered under the STORY LINE™ trademark.

System Components

FIG. 1 is a block diagram that illustrates components of the responsive advertising system, in one embodiment. The system 100 includes an authoring component 110, a publishing component 120, a request receiving component 130, a client identification component 140, a user identification component 150, a dynamic advertisement component 160, and an advertisement execution component 170. Each of these components is described in further detail herein.

The authoring component 110 provides an authoring environment in which an advertiser can define a single advertising unit that dynamically responds to multiple client devices having multiple screen sizes. Dynamically responding refers to the ability of the advertising unit to change in real time based on a set of rules set up by an author in a programmable fashion (programmatic creative) or by manually setting up what the change will be. The authoring environment may provide a web-based interface, custom application, or other interface through which an advertiser can access the system to create advertising units. The authoring environment may provide a what-you-see-is-what-you-get (WYSIWYG) or other type of interface that allows the advertiser to drag and drop or otherwise specify one or more elements to include in an advertisement. The elements may include a variety of data types, such as text, images, widgets/applets, audio, video, input boxes, buttons, and so forth. The advertisement may be as complicated as any application or as simple as an image banner, depending on the requirements of the particular advertiser and campaign. In some embodiments, the authoring component 110 receives multiple versions of the advertising unit. Each version may provide a set of characteristics for the advertising unit specific to a particular screen size and/or device. The format and layout of each version may differ, such that elements are moved to different locations, selectively included or excluded, or other changes appropriate for particular screen sizes and device capabilities.

The publishing component 120 publishes an advertising unit to make the advertising unit available for clients to receive. Advertising units are typically displayed alongside some other content requested by the client, such as an online newspaper, social media site, information site, or other property or entity. Publishing may include providing the advertising unit to an advertising server that receives requests from clients and selects appropriate versions of the advertising unit to suit each requesting client. Publishing may be integrated with the system or may be handled by a third party, and may include other services such as tracking, reporting, and so forth. Publishing may also include various subscription and payment models through which advertisers compensate an operator of the system 100 for publishing the advertising unit.

The request receiving component 130 receives requests from clients to provide a published advertising unit in a format and layout dynamically tailored to the requesting client. The request may originate directly from the client or indirectly, such as through a website with which the advertisement is associated. In some cases, whether an advertisement is served by a first party or third party server is related to other considerations, such as whether a client will allow first party or third party cookies for tracking user actions related to the advertisement. The client can provide valuable contextual information from the page or from other sources as well. The request receiving component 130 receives information with the request sufficient to uniquely identify a particular user and that specifies characteristics of the client device sufficient to determine the client device's screen size and potentially other capabilities (e.g., whether ADOBE™ FLASH™ or HTML5 is supported for widgets/applets).

The client identification component 140 identifies one or more client characteristics from a received request, wherein the characteristics include at least a screen size of a client device making the request. The system 100 uses the determined client characteristics to dynamically select a version of the published advertising unit that is most compatible with the requesting client device. For example, if the client device is a desktop with a large screen, the system 100 may select a larger version of the advertising unit or have the advertising unit fit automatically to that size, whereas if the client device is a smartphone the system 100 may select a smaller version of the advertising unit. Similarly, the system may select any size, taller or wider versions of the advertising unit based on an aspect ratio of the client device and an available screen area for displaying advertisements in association with other content. In some embodiments, the component 140 receives client characteristics through information provided by a web browser, such as a hypertext transport protocol (HTTP) user agent tag. In other cases, the component 140 may receive previously stored information about the user's device, such as from an online profile associated with the user in ways that follow the legal guidelines of privacy law.

The user identification component 150 identifies a user associated with the received request. It is relevant to note that identifying a user does not necessarily entail revealing any personally identifiable information (PII). For example, the system 100 may associate a user identifier with each user that is sufficient to uniquely identify the user to the advertiser, but the user identifier may be insufficient for the advertiser to know the user's actual name, contact information, or other identifying information. Knowing the user associated with a request allows the system 100 to know when the same user is visiting and requesting an advertising unit from different devices. This enables the system 100 to perform the kind of story-based evolution of advertisements served to the same user described herein. The identity of a user may be provided by the site or other property that the advertisement is associated with. For example, if the advertisement is served along with the user's social network content on Facebook, then Facebook may provide the system 100 with an identifier that identifies the user. Whether the user visits from his or her mobile phone, tablet, desktop computer, laptop, or other device, the social network will know the user's identity (because the user logs in to the site), and can provide related information to the system 100 to use for dynamic advertisements.

The dynamic advertisement component 160 dynamically selects a format and layout of an advertising unit to serve to the identified user and client device. The format may include the inclusion or exclusion of particular elements that are or are not suitable for the identified client device, while the layout may include resizing the overall advertisement as well as relocation and/or sizing of individual elements within the advertisement. For example, on a tall device with limited width, a suitable version of the advertisement may include multiple stacked elements running vertically down the screen, whereas on a wider, large display device a suitable version of the advertisement may be squarer and include the same elements spread more evenly in horizontal and vertical directions. As described herein, the system 100 may include both automatic formatting capabilities as well as manually receiving particular versions of the advertising unit from an advertisement author. Automatic formatting may include allowing the width or other characteristic of a particular element to be dynamically determined as a percentage or other relationship to the available width of a particular client device. For more control, authors may choose to provide an advertising unit in versions that match popular advertising sizes or client device sizes. However, even where an author manually provides multiple versions, the content of the advertising unit may still contain dynamic elements (e.g., images, widgets, or applets with changing content), and is still easier for the author to manage in a single campaign, rather than each version being a different and disconnected campaign.

The advertisement execution component 170 executes a selected format and layout of the advertising unit on the client device to render the advertisement and its dynamic content on the client device. In some cases, the component 170 may include readily available resources of the client, such as a browser capable of running HTML5 applications, or a plugin such as SUN™ JAVA™ or ADOBE™ FLASH™ capable of running custom applications for those platforms. In other cases, the component 170 may include server-side execution of the advertising unit that produces an image or other compatible container for serving to the client. In still other cases, the system 100 may include a combination of client and server side execution of advertising unit elements. The advertising unit may include elements that dynamically respond to present conditions under which the advertising unit is requested. For example, the system 100 may employ information about where the user is currently located (e.g., through GPS, Wi-Fi, or cellular triangulation capabilities of the client device), how many times the user has viewed the advertising unit (from any device), what stage the user is at in a process (e.g., a purchase pipeline), a time of day, promotions of the site the user is visiting, or any other information. This information can be used by the system 100 based on authoring conditions set up by the advertisement author to dynamically modify the format and layout of the advertising unit in a manner specified by the advertisement author. Thus, the content of an advertisement at any time and on any particular device is subject only to the limits of the creativity of the advertiser.

The computing device on which the responsive advertising system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

System Processes

Figure 2:
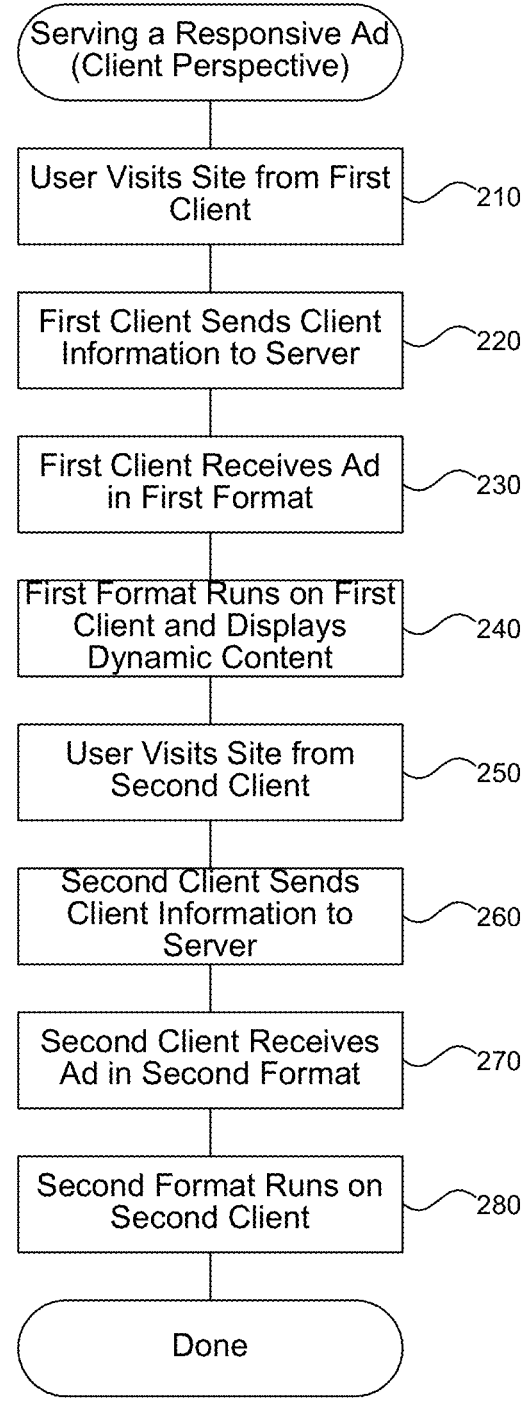
FIG. 2 is a flow diagram that illustrates processing of the responsive advertising system to serve a responsive advertisement to a user using multiple devices over time from the client (i.e., user device) perspective, in one embodiment.

FIG. 2 is a flow diagram that illustrates processing of the responsive advertising system to serve a responsive advertisement to a user using multiple devices over time from the client perspective, in one embodiment. Beginning in block 210, the system receives a request from a user using a first client device to visit a network-based property that includes a dynamic, responsive advertisement. The user may be using a desktop computer and running a browser application to browse the World Wide Web. A particular website the user is visiting may include an embedded advertisement on the web page the user is viewing, and by requesting the web page, the browser also requests the embedded content, including the advertisement.

Continuing in block 220, the system sends client information describing the first client device to a server that hosts the advertisement. The information may travel directly or indirectly to the server. The client information may include information useful for selecting an appropriate format and layout of advertisement including items such as a screen size of the first client device, a browser being used for the request, whether particular plugins or other capabilities are available on the first client device, a hardware and/or software platform of the first client device, and so forth.

Continuing in block 230, the system receives at the first client device the requested advertisement in a first format from the server. Upon receiving the request from the first client device, the server selects an appropriate format of the advertisement and provides that in response to the client request, as described in further detail with reference to FIG. 3. The format may include one or more dynamic elements that are selectively included by the server based on the sent client information, as well as a layout for each element and the advertisement as a whole that specifies the overall size of the advertisement and where each element of the advertisement is placed within the advertisement (position and size).

Continuing in block 240, the system executes dynamic content of the received first format of the advertisement to display the first format of the advertisement on the first client device. Based on the dynamic conditions present on the first client device at the time of displaying the advertisement, the advertisement may appear different than it would on another device at a different time or under different conditions. In this manner, the advertisement seen by the user may evolve over time and across devices in a manner determined by an author of the advertisement to accomplish advertising goals of the author. For example, the advertisement content may change as the user changes location to be closer to a store that carries an item or as the user changes state to be further along in a process of evaluating an item or service for purchase.

Continuing in block 250, the system some time later receives a second request from the user using a second client device to visit the network-based property that includes the dynamic, responsive advertisement. For example, having first viewed the advertisement on the user's desktop computer, the user may later view the advertisement from the user's smartphone. In the process, the user may have changed other state, such as leaving work and driving home or elsewhere, beginning to review a specific item, and so forth.

Continuing in block 260, the system sends client information describing the second client device to the server that hosts the advertisement. The client information differs from that of the first client device, and in response, the server may select a different, second version of the advertisement or different second version of the elements of the advertisement for serving to the second client device. The second version may include different elements and may reposition or resize elements present in the previous, first version of the advertisement seen from the first client device. For example, a large element may be excluded and replaced by a smaller, mobile-ready element. Applets that would run fine on a desktop device may be replaced with mobile counterparts that are better suited to a mobile device. Text that could be verbose on a large screen may be shortened to convey a similar message in a smaller format on a mobile screen. These and numerous other changes in format can be specified by the advertisement author during the authoring process.

Continuing in block 270, the system receives at the second client device the requested advertisement in a second format from the server, wherein the second format differs from the first format based on the sent client information of the first and second client devices. Upon receiving the request from the second client device, the server selects an appropriate format of the advertisement and provides that in response to the client request, as described in further detail with reference to FIG. 3. The elements and their layout provided in the second format differs from that in the first format based on characteristics of the second client device and as specified by the advertisement author. This provides a dynamically adjusting advertisement that the author manages in a single advertising unit or campaign.

Continuing in block 280, the system executes dynamic content of the received second format of the advertisement to display the second format of the advertisement on the second client device. Based on the dynamic conditions present on the second client device at the time of displaying the advertisement, the advertisement may appear different than it would on another device at a different time or under different conditions. In this manner, the advertisement seen by the user may evolve over time and across devices in a manner determined by an author of the advertisement to accomplish advertising goals of the author. For example, the advertisement content may change as the user changes location to be closer to a store that carries an item or as the user changes state to be further along in a process of evaluating an item or service for purchase. After block 280, these steps conclude.

Figure 3:
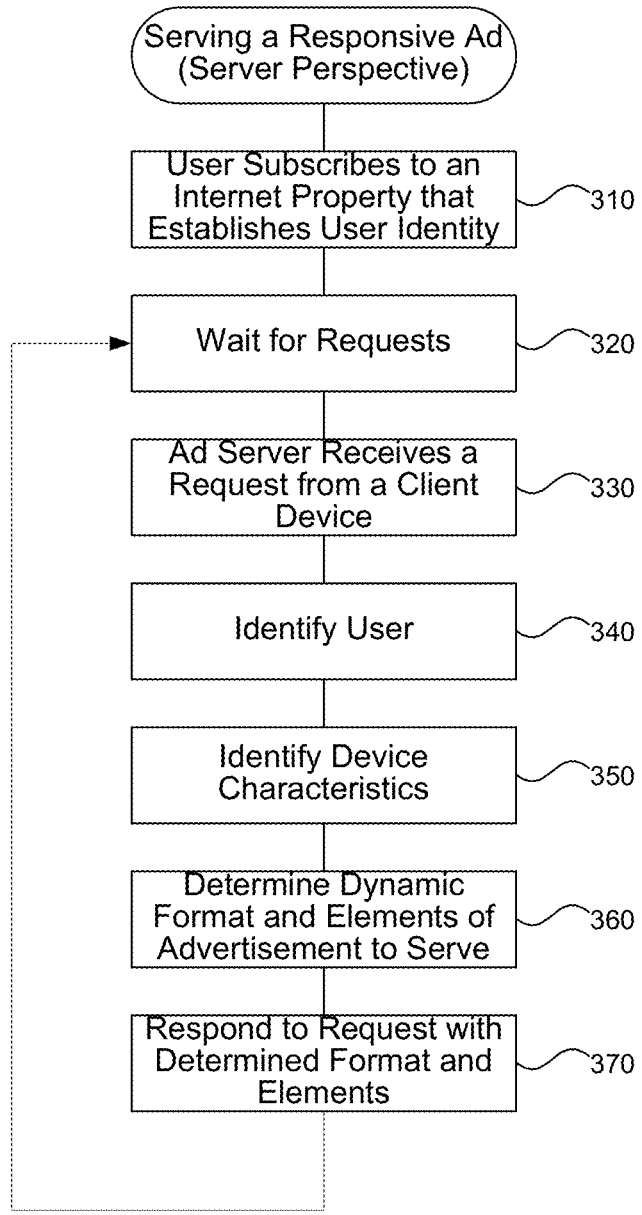
FIG. 3 is a flow diagram that illustrates processing of the responsive advertising system to serve a responsive advertisement to a user using multiple devices over time from the server perspective, in one embodiment.

FIG. 3 is a flow diagram that illustrates processing of the responsive advertising system to serve a responsive advertisement to a user using multiple devices over time from the server perspective, in one embodiment. Beginning in block 310, the system receives information from a user that subscribes to an Internet property that establishes a user profile and identity for the user. For example, the user may subscribe to an online publication, like the Guardian, a social network, like Facebook, or any other Internet property that has some concept of a user profile and identity, so that when a user visits the property that user can be distinguished from other users.

Continuing in block 320, the system waits for requests to serve a dynamic advertisement to one or more users of the Internet property. For example, the server may provide an HTTP server that listens on a port (e.g., port 80) for incoming HTTP requests to serve advertisements. The server may be a server of the Internet property or a third party advertising server that provides embedded advertising subsets of one or more web pages. Although described as a single server herein, those of ordinary skill in the art will recognize that a server may include a farm of servers, and potentially many layers such as front doors, back ends, and so forth to more optimally service incoming user requests. The servers may also be geographically distributed to serve users from multiple countries or other locales more efficiently.

Continuing in block 330, the system receives a request from a first client device to access an advertisement to display on the first client device. The request may include information identifying which advertisement the client device is requesting, such as a uniform resource locator (URL) that includes the server's domain name and a virtual path and/or query string that identifies the advertisement being requested. The request may also include other properties, such as a user agent tag associated with the client device, as well as information about the user, such as that stored in a cookie on the first client device and associated with the user.

Continuing in block 340, the system identifies the user that initiated the request. Identifying the user may not include personally identifiable information (PII), but includes information sufficient to distinguish the user from other users of the system. Privacy concerns are often balanced against providing rich functionality, and any particular implementer of the system or advertiser using the system, may elect to strike the balance along a spectrum of knowing virtually nothing about the user to having a fine level of detail of information about the user. The system, with safeguards to protect PII, may identify the user from cookie, some authentication system (e.g., oauth), or other information provided with the received request. In some cases, the system works in association with the Internet property to identify the user based on the profile information stored by the Internet property. For example, advertisements on a social network like Facebook may request an identifier with which to associate with a particular user request from the social network that the user is accessing.

Continuing in block 350, the system identifies one or more characteristics of the first client device, including at least screen dimensions of the first client device. The system may identify the characteristics of the first client device from information, such as a user agent tag, provided with the received request. From this information, the system may gather a rough or specific idea of the screen size of the first client device, as well as other characteristics such as whether the first client device supports particular plugins for running applets, a hardware and/or software platform of the first client device (e.g., Mac, iOS, Windows, Android), and so on.

Continuing in block 360, the system uses the identified user and characteristics of the first client device to determine a first dynamic format and elements of the requested advertisement to serve to the first client device. The system may select from one or more versions of an advertising unit defined by an advertisement author using an authoring tool provided by the system. For example, in some cases the author will have provided a specific format and layout of the advertising unit that is a good match for the first client device's screen and other characteristics. The system may also provide one or more levels of automatic adjustment of a flexible advertising unit provided by the author to adapt the advertisement in specified ways to the characteristics of the requesting client. In addition, the system may apply present state information based on the identity of the user and/or characteristics of the first client device to dynamically adjust the format and elements of the advertising unit to respond in ways specified by the author.

Continuing in block 370, the system responds to the received request with the determined first dynamic format and elements of the requested advertisement, such that upon receiving a first request from a first device associated with the user and a second request from a second device associated with the user, the system determines a different dynamic format and elements to serve to each device, wherein the dynamic format and elements served to each device are responsive to one or more characteristics of each device. In this way, the system provides potentially many different versions of the same advertising unit to potentially many possible variations of client devices and users. After block 370, the system loops to block 320 to wait for further requests.

Figure 4:
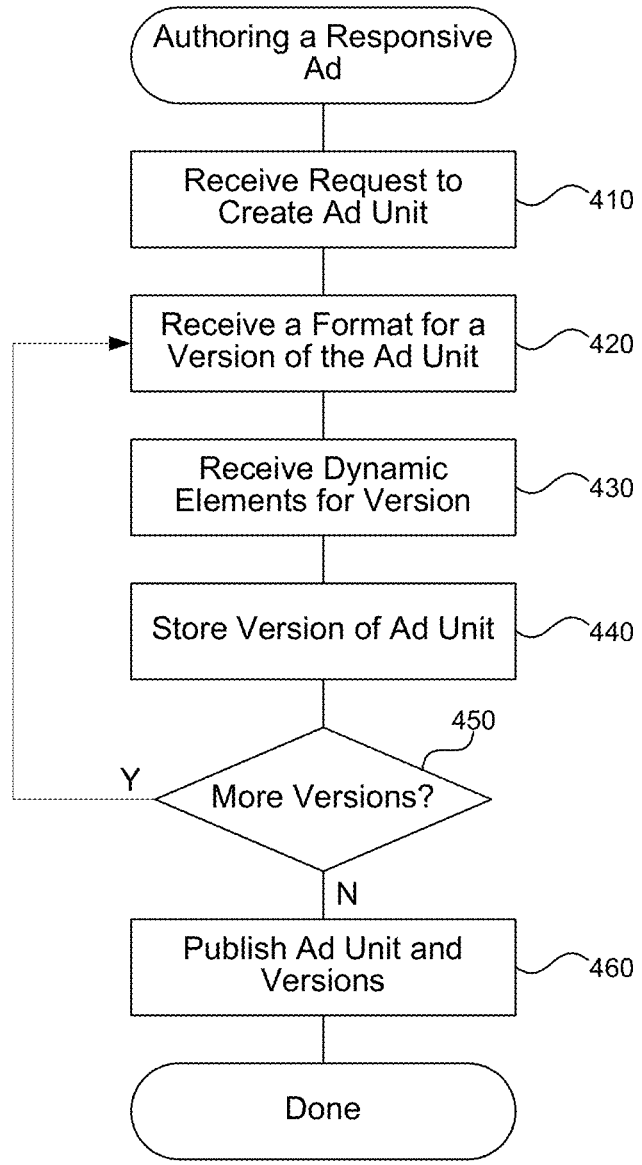
FIG. 4 is a flow diagram that illustrates processing of the responsive advertising system to author and publish a responsive advertisement unit that dynamically changes for different clients, in one embodiment.

FIG. 4 is a flow diagram that illustrates processing of the responsive advertising system to author and publish a responsive advertisement unit that dynamically changes for different clients, in one embodiment. Beginning in block 410, the system receives a request from an advertising author to create an advertisement unit having dynamic format and content for multiple client devices. For example, the author may visit an authoring tool provided as a web page or other interface by the system and may request to create a new advertising unit and/or campaign. The system may provide a profile for each author where the author can log in to view published advertisements and to create new advertisements or the dynamic elements or creatives of that advertisement using the framework described herein.

Continuing in block 420, the system receives a format for a first version of the advertisement unit. The author may start by select an overall size for the advertisement (e.g., 970× 100) and may provide a blank canvass onto which the author can drag or otherwise specify elements to include in the advertisement. The authoring environment may include a toolbox of potential elements (e.g., text boxes, images, videos, audio, applets, and so on) as well as allowing the author to add custom element types to the system.

Continuing in block 430, the system receives one or more elements and layout information for the received elements that will comprise the content of the first version of the advertisement unit. For example, the author may select an element, such as a text box, and the author may place the element at a particular location within the version of the advertisement unit. The author may also resize the element, to define its boundaries, as well as specifying content of the element, such as text to display, formatting of the text, and so forth. The author continues in this manner until he or she has added all of the desired elements to this version of the advertisement unit. The author may also specify conditional information associated with elements that are conditionally displayed or for which the formatting is based on values associated with one or more conditions that will be evaluated at the time of serving and/or displaying the advertisement.

Continuing in block 440, the system stores the first version of the advertisement unit as defined by the advertisement author. The system may include one or more data stores for storing received advertisements, and from which an advertisement server of the system accesses advertisements upon receiving requests to display the advertisements.

Continuing in decision block 450, if the advertising author requests to define more versions of the advertisement unit for other potential client devices, then the system loops to block 420 to receive those additional versions and associated elements and formatting information. An author may specify versions for each of the types of client devices expected to display the advertisement, as well as default versions of the advertisement to be displayed when no more specific version is available for matching to a particular client device.

Continuing in block 460, the system publishes the advertisement unit and received versions as a unified entity designed to dynamically respond to multiple client device screens but be managed as a single entity by the author. Publishing the advertisement makes it available for display on websites or with other associated content, and engages the serving capability of the system to dynamically select and modify advertisements based on the received versions and characteristics of any particular client device from which a request for an advertisement is received. After block 460, these steps conclude.

Multi-Screen Advertising

With the growth of smartphones, tablet devices, and digital signage that have compatible browsers to desktop computers, an array of devices with screen sizes that span from 2" all the way up to 50~92" (e.g., in the case of browser-based Web TVs) is now a reality. As an advertiser or publisher, having to create different assets for these different screen sizes and contexts can be quite a heavy and costly process. In order to streamline this process, having ad units that conform or fit to different standards and sizes can be a very strong opportunity to not only make the process simpler, but also to offer correlation analytics for each different scenario in one unit. The ad operations process is quite task heavy and costly when it comes to having multiple creatives and needs to be configured to different third party ad tags for delivery. In some embodiments, the responsive advertisement system provides three different response mechanisms (sometimes referred to as "Triple Response") as they come together to create relevant advertisements across multiple screens based on a flow line in a story-line form (cross-screen).

The three types of responsive elements applied by the responsive advertising system are: 1) ads that respond to device assets or content objects, 2) ads that respond to situation or context, and 3) ads that respond to the user. The responsive advertising system applies these three different areas together into a method of configuring an ad to dynamically change in real time.

Ads that respond to device assets or content objects relate to making the ad unit ubiquitous for any screen or media object. For example, based on input specifying information from the devices themselves, the system may provide a shape (size) of the ad footprint that is possible. The ad itself changes shape to respond to screen size. There are two ways to do this provided by the responsive advertisement system. One way is to use swap ads (which is a package of specific advertising creatives that each are delivered to the relevant size of the screen or object) and the other is to use stretch ads (that is an actual one creative that changes size and shape when viewed from different screens or objects).

One way to look at this is with the different IAB (Interactive Advertising Bureau) standards for different screen sizes (e.g., desktop; 728×90px, tablet; 468×60, mobile; 300×50). If the ad changes shape to conform with these different standards for different views automatically this would be an example of this approach. The different areas that determine how an ad can respond are as follows: screen size or pixel width that determine break points, the actual reference to the device itself (this is a subset of the pixel width), and the actual technology or web application (such as the ad fitting into a video player, into an application, and so on).

The second type of responsive element applied by the responsive advertising system includes ads that respond to situation or context. This relates to the way the ad unit behaves based on the situation or context. For example, the system may receive as input information about the outside surroundings or the places, time circumstances for the user to engage in the site, and provide as output the actual design of the ad itself. This may mean that depending on the contextual circumstances, the ad could change color, design, or overall contents. Each circumstance is separated and each design for each ad for screen size would be independent of each other. The way the ad works mechanically from screen to screen may also vary (e.g., touch vs. click).

The third type of responsive element applied by the responsive advertising system includes ads that respond to the user. This relates to the way the ad interacts with the user with conversational dialog and copywriting of the ad. For example, the system may receive as input an identification of who is the user or segment and provide as output text or language in the ad based on what the user has done, experienced the ad campaign before, the point in the purchase process and the social community around him/her. The actual text content changes from screen to screen to best accompany the best response for the user. If the user sees the ad (brand marketing) on one screen, the ad can then move to a direct responsive ad (intent based text copy) on another screen or mobile screen.

Stretch Ads

Figure 5:
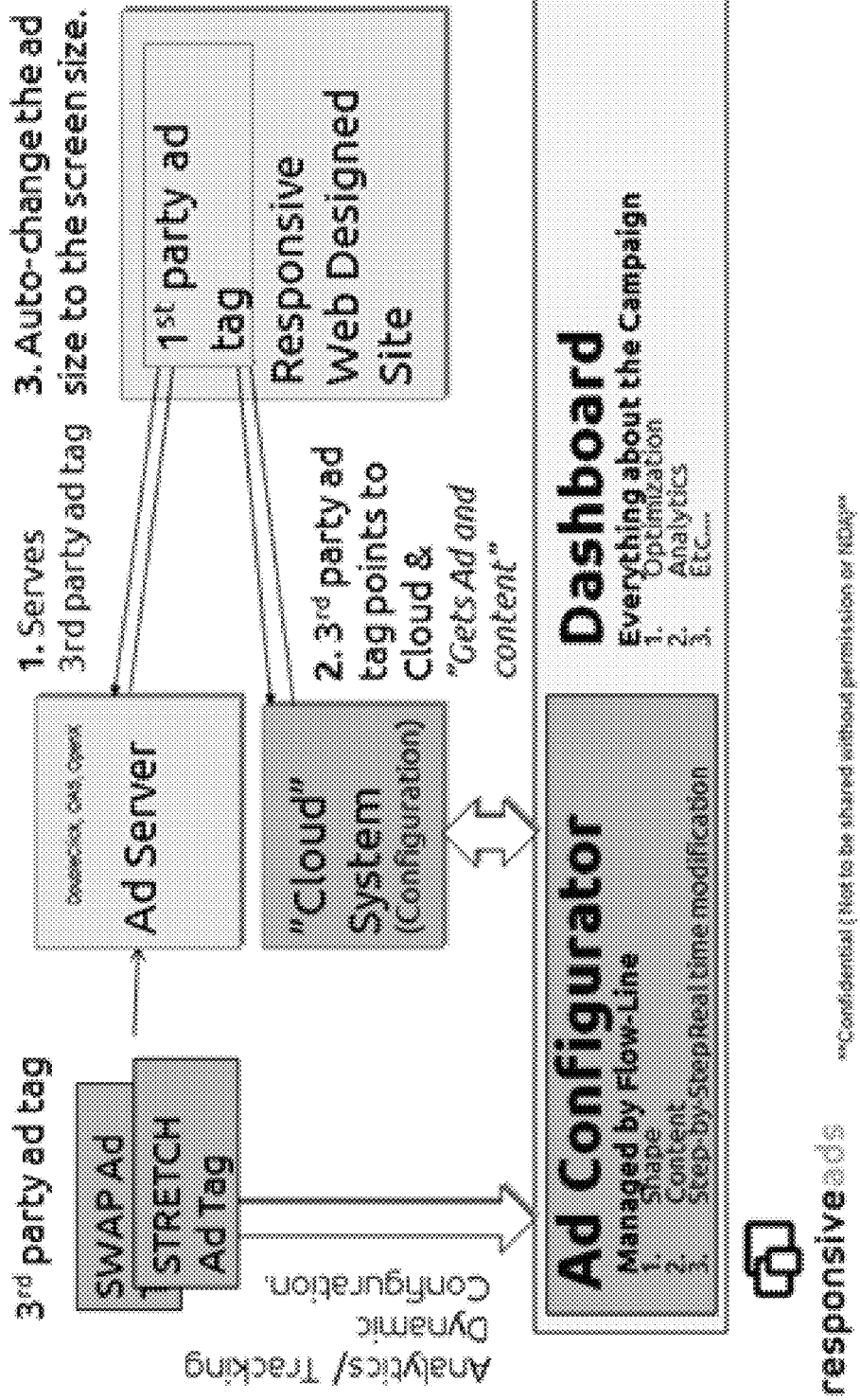
FIG. 5 illustrates an architecture used to create and manage stretch ads.

The following paragraphs further described stretch ads. Stretch ads refer to the ability for ads to morph elastically and change based on screen, context, and user. FIG. 5 illustrates an architecture used to create and manage stretch ads. Based on a dashboard or configuration manager, the ad is created and hosted as a flexible ad unit. In some embodiments, there is only one ad built in HTML5 with a foot print and its contents can dynamically change with the elements of the content being streamed and served (separately from an ad server that delivers the ad tag) from a host in the cloud. Any of the different elements of the ad, such as the colors, the images, the text, the animation, the integrated application-programming interfaces (API's) can all be delivered dynamically into any form deemed relevant by the controlling dashboard automatically or via the marketer operating the control panel themselves.

The responsive advertising system applies a concept called flow lines. Previously, there have been a lot of technologies and solutions surrounding specific channels such as mobile, online, or tablet alone. However, the technology to making advertising more relevant as a summation is the concept of a single advertisement that can act as a story line for the systematic transition of a user from one screen to the next. Today, with the concept of screen shifting, a user will access one screen (e.g., a desktop computer) during a certain time of the day, and then access other screens such as mobile when on the go. Having a technique to allow for one ad delivered for a specific campaign to change dynamically based on the triple response described above can be very powerful for better engagement and actions with users.

Although the stretch ads configuration described above provides one way to solve the one-ad-fits-all dynamic configuration based on the flow line concept, the system may not be limited to this approach only. For example, the system also provides a concept of swap advertisements as well. Even the issue of a flow line acting like a form of playlist of advertisement configurations on page that can become a complete flow of multiple ads per page.

Flow Lines

The flow line concept provides a number of improvements over previous technology. Flow lines provide a process that works with any different type of creative for multi-screen advertising (e.g., stretch, swap, or a combination). Flow lines provide an ability to create a first party or third party ad tag that works everywhere on all screens, significantly taking away the complexity of the Ad Ops multi-screen process. Flow lines provide real-time dynamic configuration of the ad creative without having to change the ad tag. This gives the marketer the ability to best enhance or make the ad creative best suited for the campaign. Flow lines provide a simple way to create a story line for the end-user journal of content or advertising experience. Flow lines create a method for enabling a complete package or sponsorship of a particular inventory spot that exists across all screens. Flow lines provide a flexible way to configure legacy ad creatives (such as Flash for desktop and HTML for mobile) as one campaign. This can be achieved with the swap configuration, for example. Flow lines have the ability of a complete multi-screen analytics and reporting process that brings everything together around a specific campaign. Flow lines are complementary to any existing ad server or Ad Operations (Ad Ops) process today. Flow lines assure the highest quality of each different visualization of ad from screen to screen. Flow lines provide ads that can work in any screen position (e.g., landscape vs. portrait mode). Flow lines provide an ability for creating ads that best position on a website. For instance, if several ads are sold to be above the fold on desktop, it allows both the publisher and the advertiser to have those ads maintain that inventory/sales strategy to be in a proper shape and form above the fold even on mobile screens.

The following paragraphs describe different techniques and concepts related to flow lines. A flow line is based on dynamically changing the shape of the advertisements, and the ability for the ads themselves to morph or change sizes based on a configuration of the flow line. The flow line gives a way of setting what the shapes will be for a specific responsive web design site at different break points that determine where the site changes shape based on the different widths of the screen or object. These flow lines can be in configured on the actual site itself and then the ad that is served fits into the flow-line embedded into the site. The other method is to have the flow line itself incorporated into the ad and the ad tag. This enables the ad to fit to the designated site in the configuration originally set for the ad itself.

Figure 6:
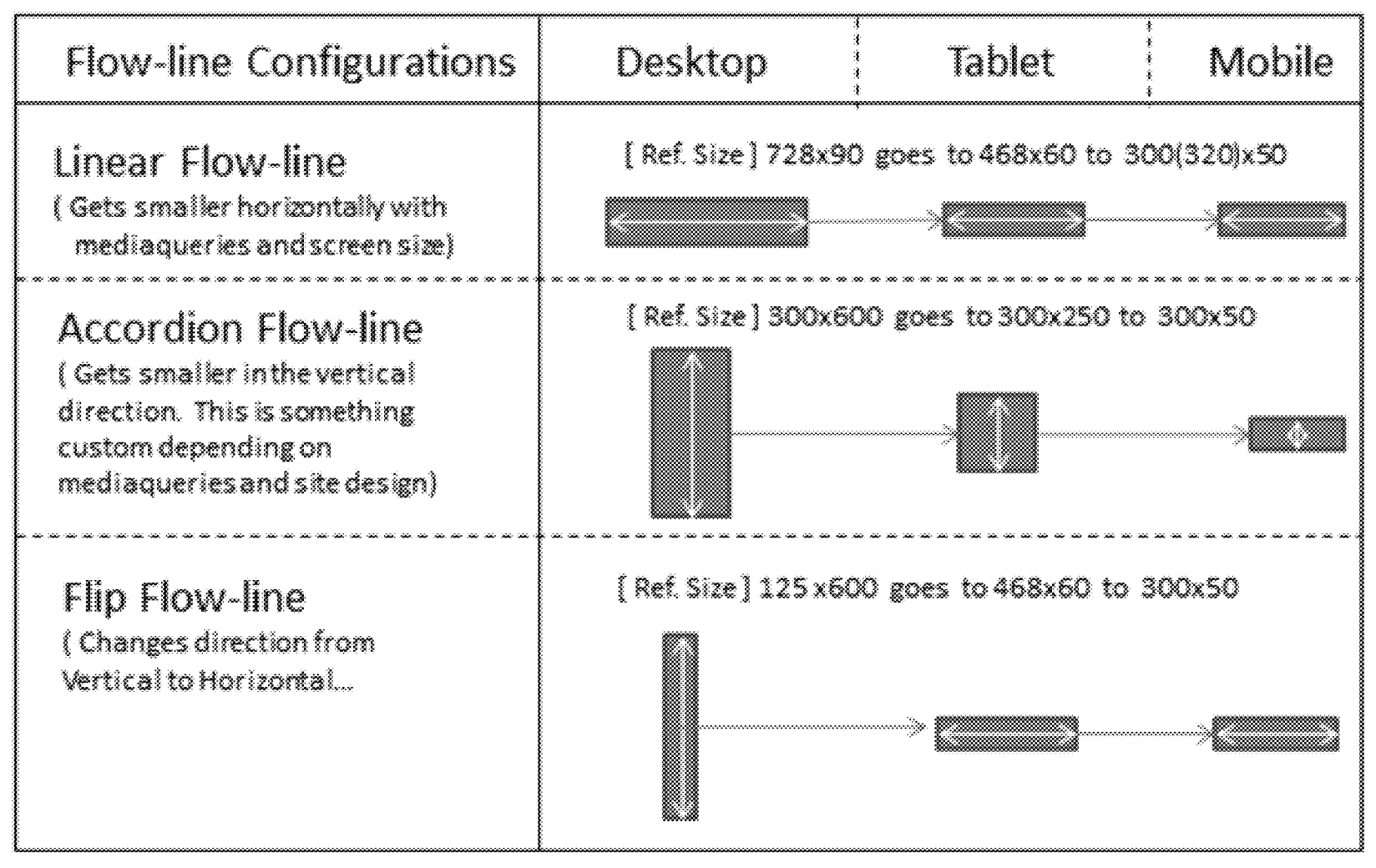

FIG. 6 illustrates several different flow lines that have been created for demonstration purposes. There can be an unlimited number of flow lines defined by the publisher or advertiser. In a linear flow line, the ad itself shrinks down horizontally to fit to a predetermined size at different break points or device settings, and scales in a linear fashion. In an accordion flow line, the ad itself shrinks in the vertical dimension to fit to a predetermined size at different breakpoints of device settings. This is a more advanced form of linear flow line as the shape is not dictated only by media queries, but by the ad height changes. In a flip flow line, the ad itself changes shape from a vertical configuration to a horizontal configuration. In a custom flow line, the ad itself changes to completely different or random shapes from screen to screen. Besides the different shape configurations that fit to each different level the flow line concept also allows advertisements to respond in a fluid matter to different screen sizes.

Figure 7:
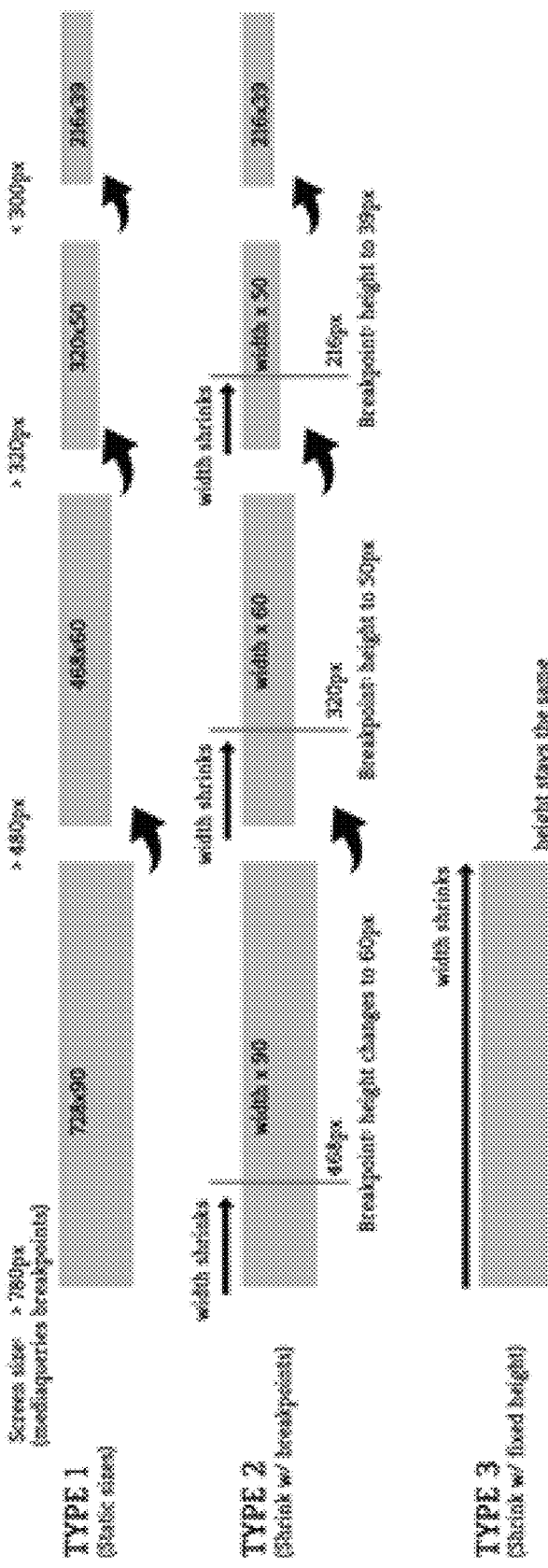
FIG. 7 illustrates five different types of flow line transitions.

FIG. 7 illustrates five different types of flow line transitions. When an existing ad that was created for a desktop is ingested into an intake tool provided by the responsive advertising system, the system recreates the entire ad itself to be completely liquid. The ad can be ingested as a PSD file, illustrator file, image file, or other type. The system may perform optical character recognition, image recognition, and other techniques to interpret the content provided in the input file.

Figure 8:
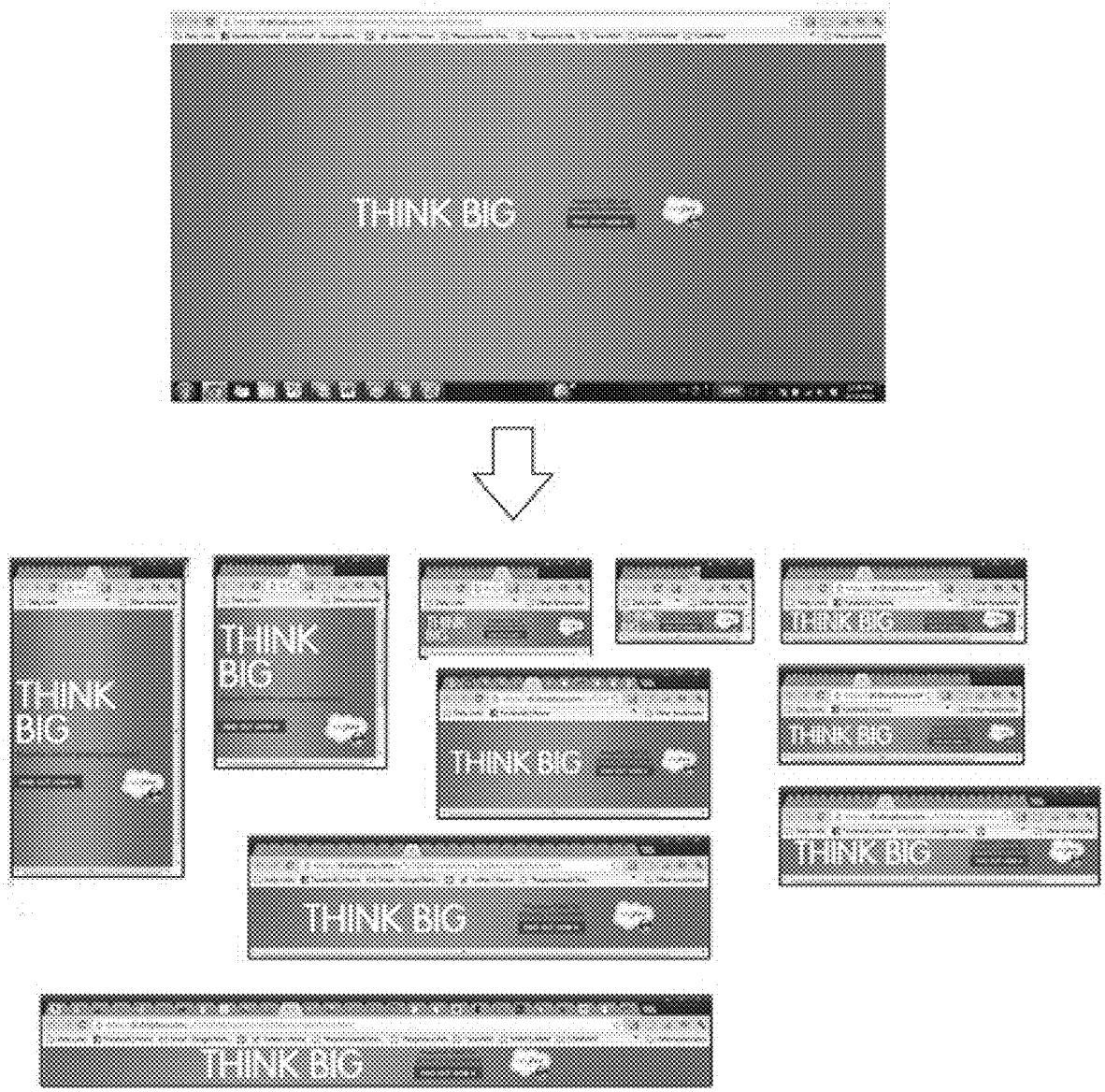
FIG. 8 shows an example of the output in total liquid form, and how the ad can be put into different shapes.

FIG. 8 shows an example of the output in total liquid form, and how the ad can be put into different shapes. These shapes are shown based on the size of the browser for example as a size. The overall process of uploading a creative to a configuration with a flow line involves uploading an initial creative base, converting the base to fluid form so that it can adapt to multiple screen sizes, and then configuring the behavior of the advertising unit with a flow line. By having an ad created in fully liquid form to fit any size, it gives the creator the flexibility to determine which flow lines they would like for the overall presentation of the ad. Depending on the most desirable shape or most relevant shape of the ad, a one-size-fits-all approach is now possible.

Figure 9:
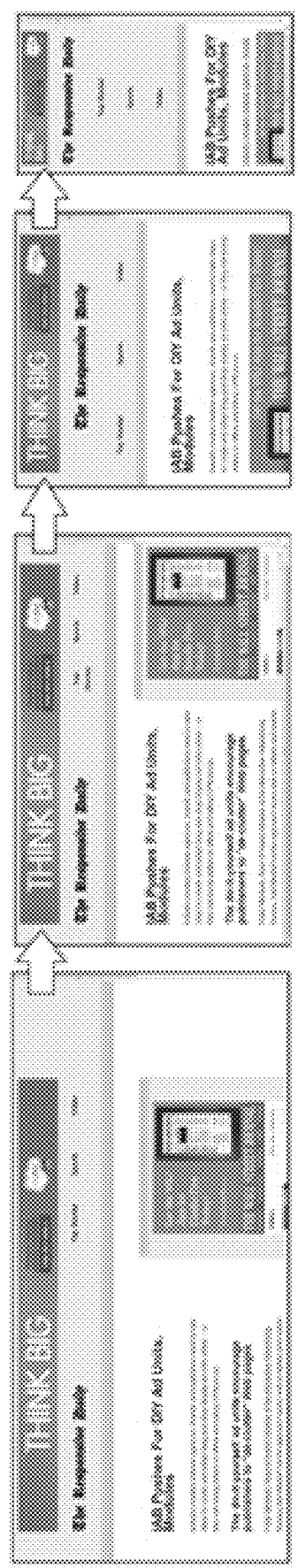
FIG. 9 illustrates a linear flow line.

FIG. 9 illustrates a linear flow line. The actual flow line configuration can be either embedded in the ad slots of a publisher's website or the ad tag itself can contain the flow line. Depending on the way the ad can best fit to the given target screen or object, it can have a different shape or perform differently. For instance, the ad can be embedded in the content or actually be a perpetual stick on the bottom of the screen. Thus, this flow line is not fixed. Depending on advertiser, the ad can be managed from a dashboard to enable the flow line to be dynamically changed in the field without having to go in and change the ad tag during a campaign.

The content of flow line based advertisements can be based on context. The previous paragraphs described the ability for the ads themselves to morph or change sizes based on a concept of flow lines. For a specific responsive web design site there are break points that determine where the site changes shape based on the different widths of the screen or object. However, the responsive advertising system can also look to configure the flow line on not only breakpoints or screen or object shape, but on external input modifiers, such as temperature, time of day, location of user, behavioral circumstances, and so forth. In other words, a storyline of the presentation of the ad from screen to screen can be set based on the context.

Figure 10:
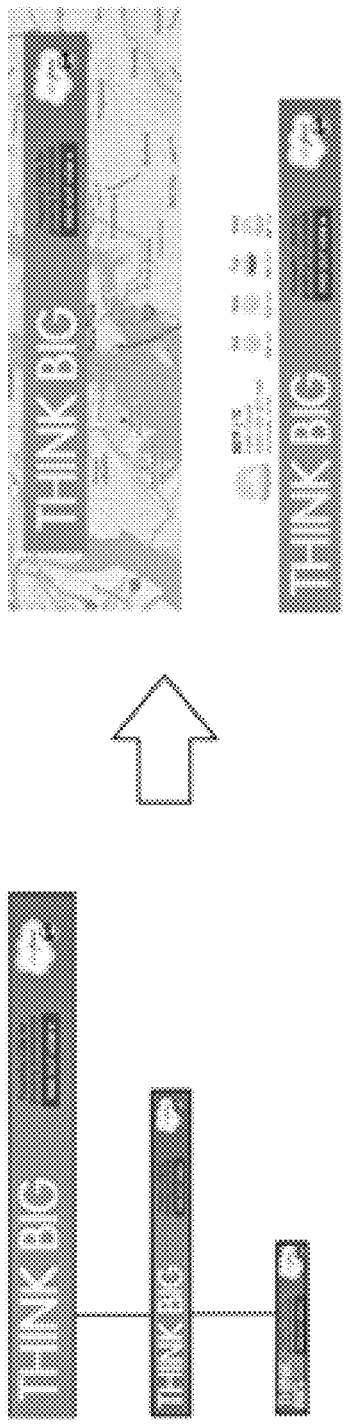
FIG. 10 illustrates a responsive advertisement that modifies based on context.

FIG. 10 illustrates a responsive advertisement that modifies based on context. By having a flow line set up for a particular ad, giving the ability to change the ad with information related to context of the situation where the ad is being shown, the system can make that ad more relevant. Advertisers manage the frequency of how often the user sees the ad and how it is now is configured in the flow line for the next step in the engagement of the user. The context around the user, such as location, weather, and the actual place the user is engaging the ad specifically for that device can all become part of targeting the campaign. The design of the contextual relevant content addition is based on the device-by-device usage.

Figure 11:
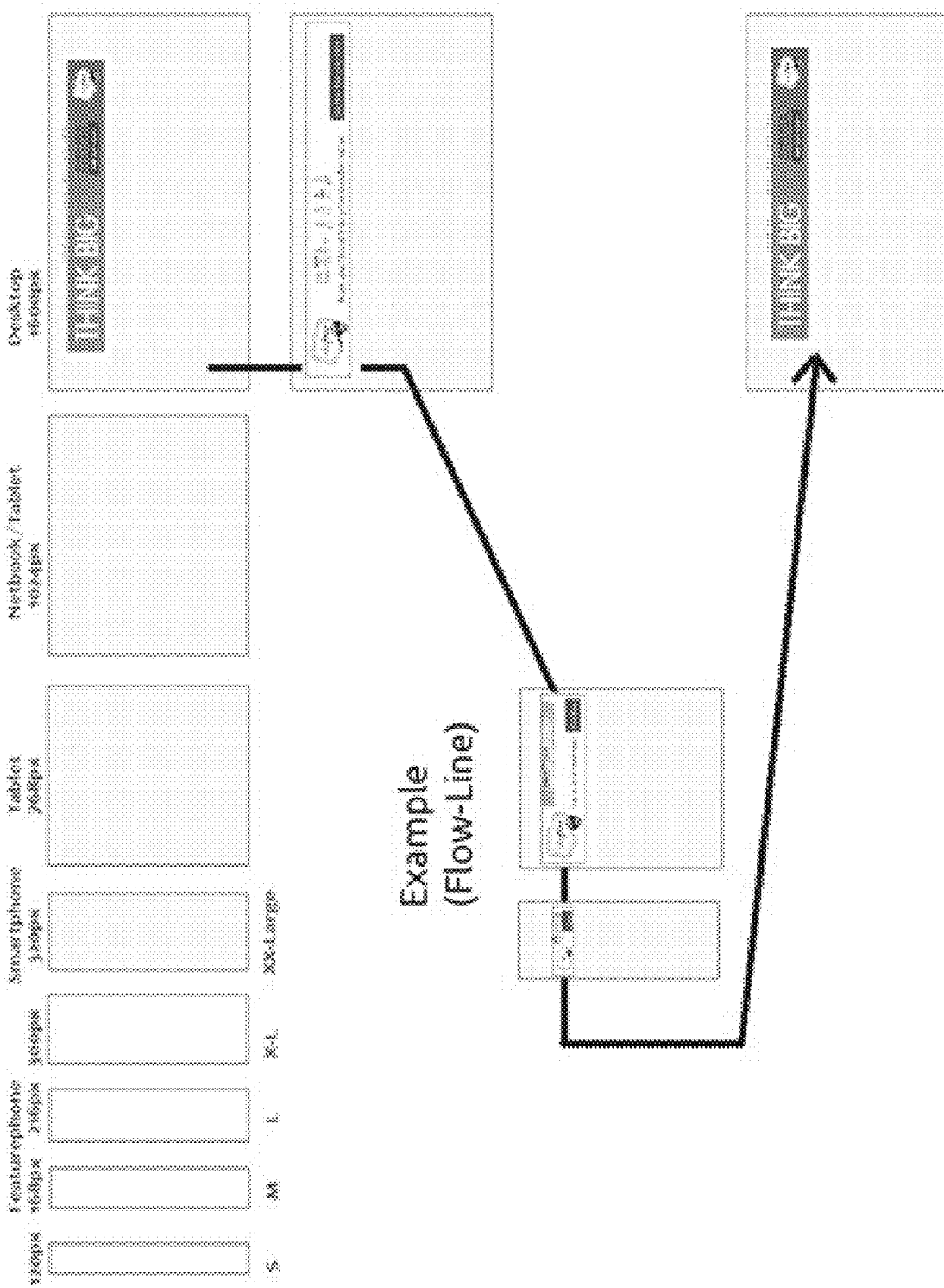
FIG. 11 illustrates the kind of multi-device retargeting and contextualization that is possible with the responsive advertising system.

FIG. 11 illustrates the kind of multi-device retargeting and contextualization that is possible with the responsive advertising system. Now with the flow line enabled stretch ad, advertisers can have elements for an ad change based on the different screens or context. Being able to configure an ad by flow line that can have this dynamically changing content can be used to give the most relevant ad for that user anytime, anyplace, and anywhere cross-screens. FIG. 11 shows how the combination of these things can now be achieved with the flow line technology. This ad is the same ad, just changing are shape and content based on the context. The flow line is what defines that changing configuration.

Flow lines can also be used to target advertising content to a particular user or user information. Given the fact that the system can modify the content in an ad itself and configure it based on a flow line, the system can now make it so that the actual content in the ad can be relevant for the user. This could mean specific information from social circles or the way the user interacts with the ad itself. Much of this is also very sensitive based on privacy, but that is something that is handled separately in the identification and targeting of a specific user. What the flow line enables is the possibility to have direct conversations with the user based on how that advertiser would like to have a story for that particular user. One example is the flow line for a specific user based on the purchase process.

How data is aggregated about the user, or the segment of the user based on activity and behavior, is a separate interface and technology that will be discussed later. The technology around the actual ad and how it can be presented in a form dynamically on the fly without changing ad server tags or the overall campaign is the job of the flow line.

Purchase Process Example (Attribution Model)

The following example illustrates a flow line customized to a user based on a purchase process. The initial ad image displays a desktop banner ad (728×90) that was created for a desktop campaign that could be run through the responsive advertising system. The ad is set for starters as a Brand Awareness campaign and as a user (or user from a particular segment) interacts with the ad across devices and over time, the ad can change based on the preset flow line. Below the ad shows the marketing funnel that indicates where the user is in the overall product purchase lifecycle.

Figure 12:
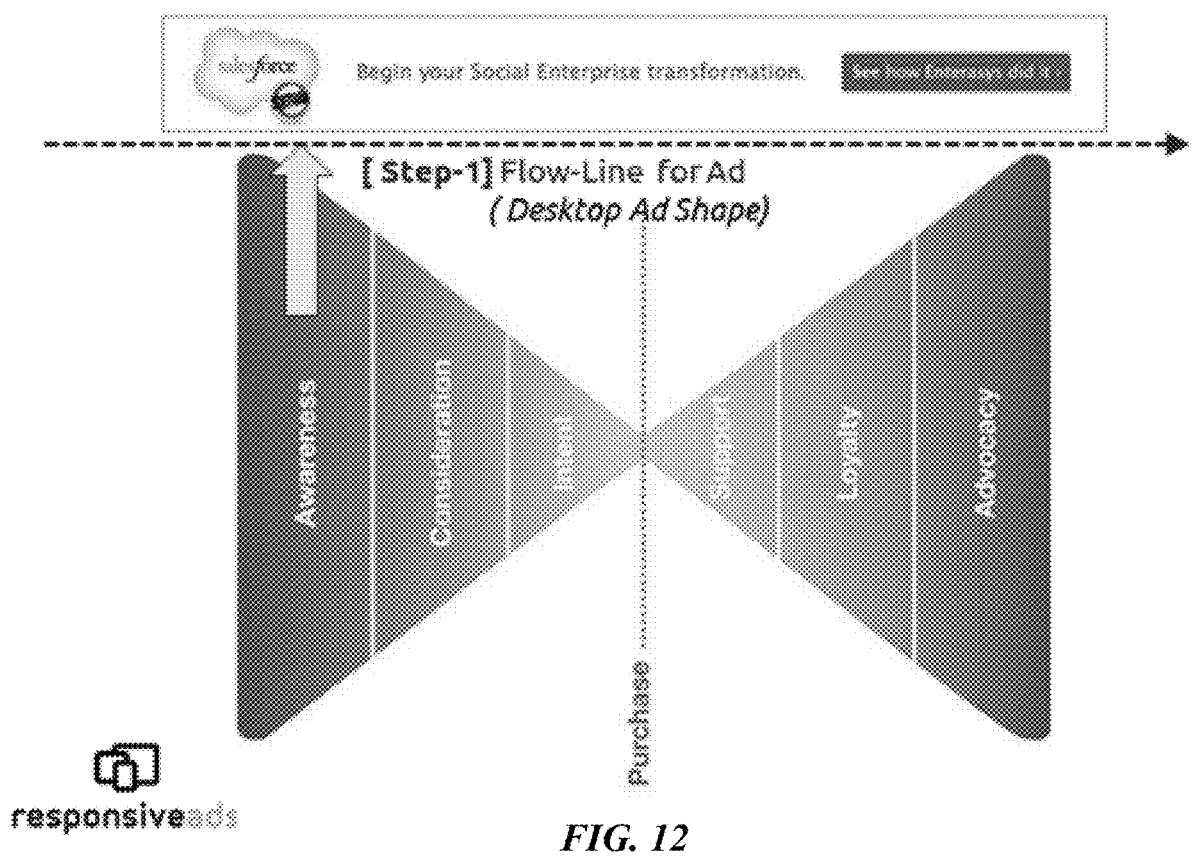
FIG. 12 illustrates a first step of the purchase process, the brand awareness step.

FIG. 12 illustrates a first step of the purchase process, the brand awareness step. The user is presented the ad for brand awareness purposes. The system can track the time viewed and any interactions as such. The flow line is set up so that if the user engages somehow with the ad or performs certain actions once the ad is shown, then they are in another part of the funnel or purchase process. For the sake of example, the next step is "Consideration mode."

Figure 13:
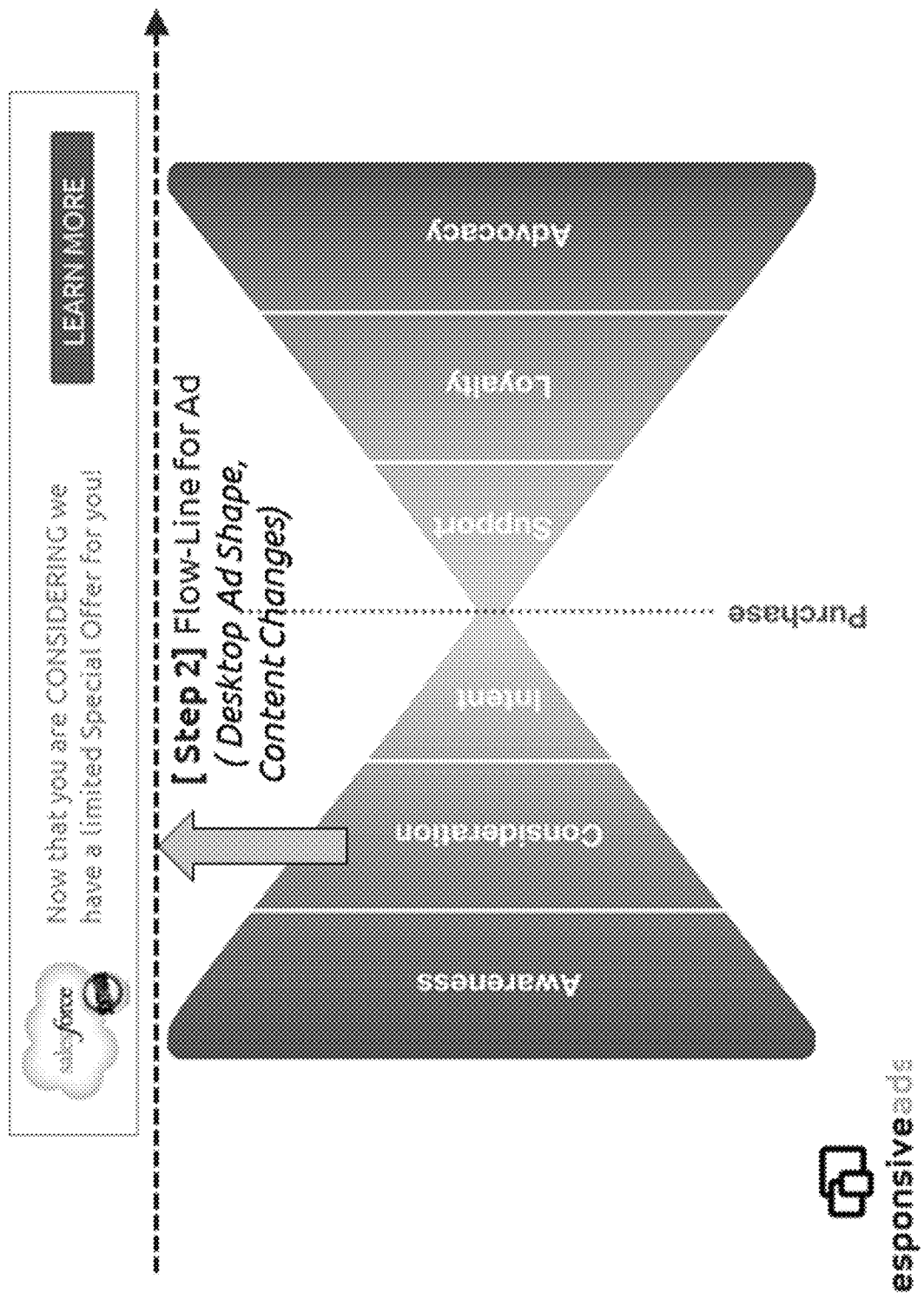
FIG. 13 illustrates a next step of the purchase process, the consideration step.

FIG. 13 illustrates a next step of the purchase process, the consideration step. Over time and based on the interactions and activities of the user, the user is then categorized in the "Consideration" mode. The ad can then change text to offer more interesting concepts to get the user to start to show some intent. If the user searches for "CRM" or they actively show that they are considering the area, the configuration in the flow line can be set up so that the ad now has text to drive the user to purchase or exhibit intent. In this case, the next configuration as part of the flow line is shown.

Figure 14:
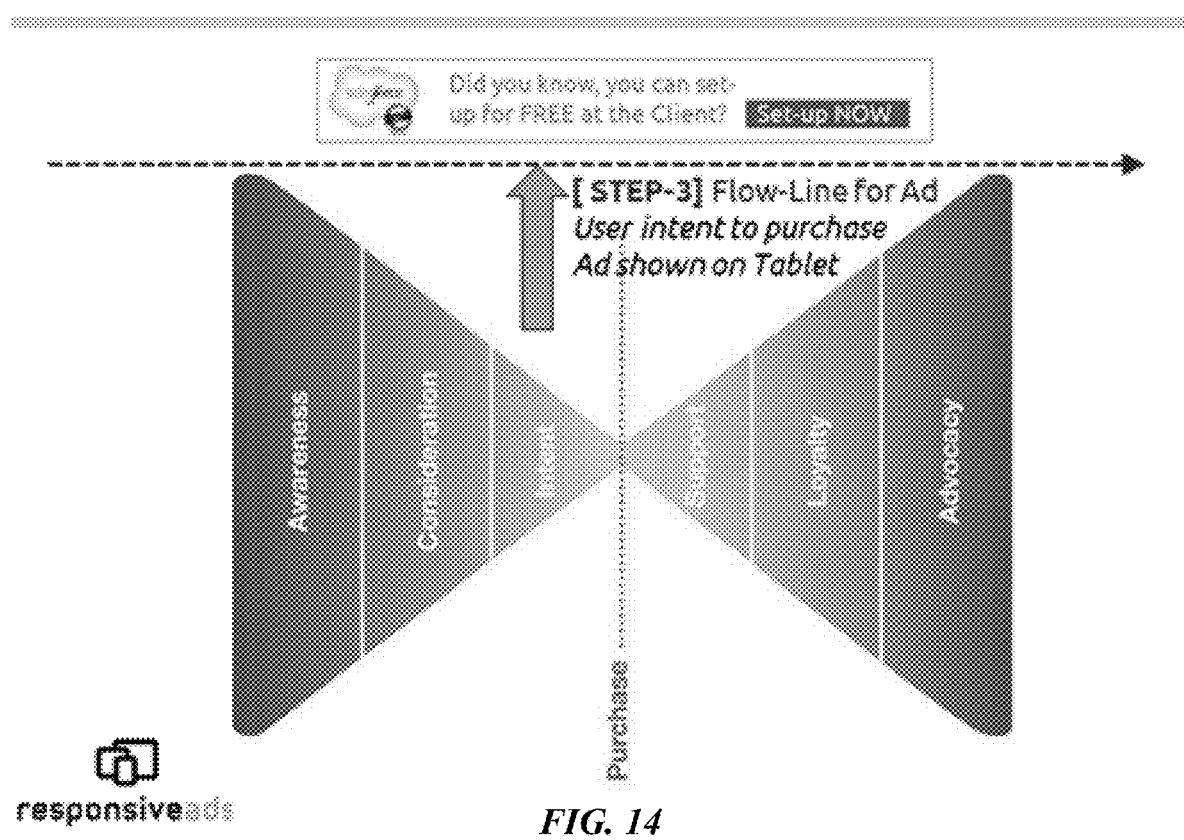
FIG. 14 illustrates a next step of the purchase process, the intent step.

FIG. 14 illustrates a next step of the purchase process, the intent step. Once the user can be considered to be showing intent, the ad again will change form based on the flow line configuration. In this case, the user is no longer on the desktop but now looking at something or doing something that can drive that intent to a purchase decision. In this example, the user is no longer looking at the desktop screen, but is now on a mobile screen. Thus, the ad is now morphed to work on the mobile screen. The contents themselves are independent of the ad shape, but configured to respond to the user now in this situation.

Having ads that respond to intent is one of the features of the responsive advertising system. With the ability to have a flow line set up for not only the shape of the ad, the context of the situation, but now the actual relationship with the user themselves across all screens, it is a very powerful driver as an ad to drive user from intent to purchase.

One example is a situation where it is known that a user really likes vegetables and is on a special diet. An advertiser of a "Salad Bar," can then be in a position to market to those groups in the mobile context slightly differently based on the behavior and usage on the desktop and change the ad dynamically to fit that given situation in mobile. The context might be that the user is near the location of the Salad Bar, and they just indicated that they are interested in vegetarian restaurants in their social stream or in search. As long as that information is provided to the platform, the ad itself can respond to that circumstance. In the case of the Salesforce ad in the figure, the user is given the indication that they can sign-up free in this moment for the service.

Figure 15:
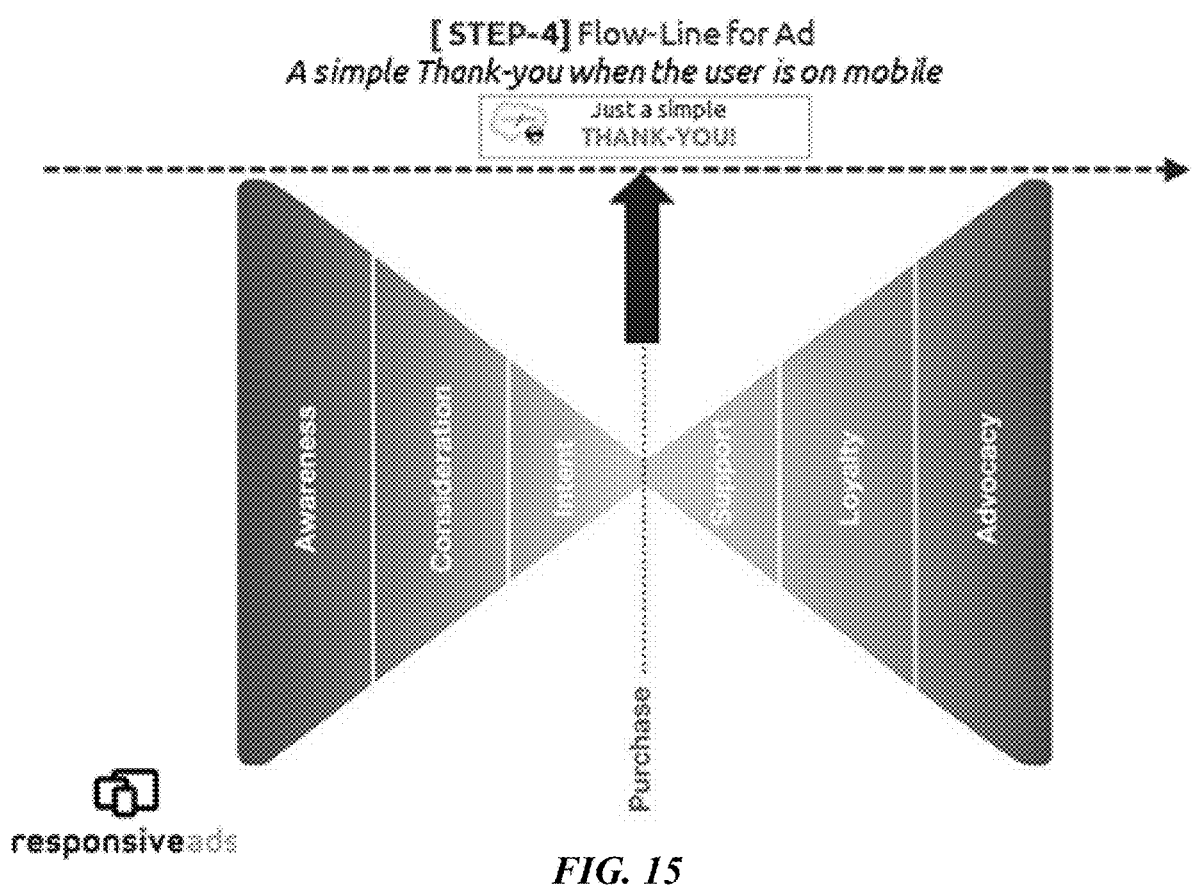
FIG. 15 illustrates a next step of the purchase process, the purchase step.

FIG. 15 illustrates a next step of the purchase process, the purchase step. Often, advertisers do not want to advertise to individuals that just purchased their product, but for example only, if the user just registered via their mobile, the ad itself can show up in the network to just say "Thank-you." The storyline of the conversations from banner ads is only exhibited here as a method to drive users to best engage and communicate after the purchase process. In this case, even the call-to-action button in the ad goes away and it is just the simple text for mobile.

Figure 16:
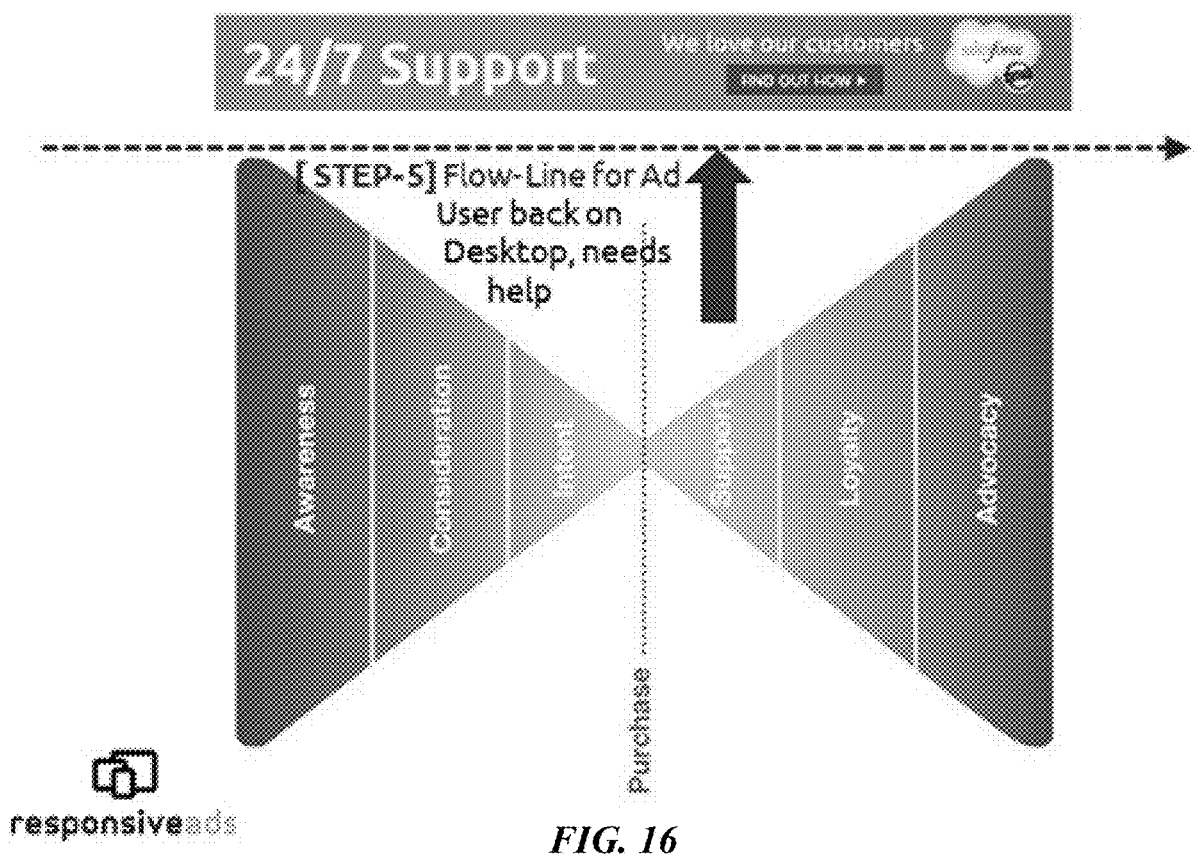
FIG. 16 illustrates a next step of the purchase process, the support step.

FIG. 16 illustrates a next step of the purchase process, the support step. If there is a case where an advertiser might want to send paid messages to potential consumers and even customers, then the ad itself can change to those that have actually purchased products. The ad could also communicate new products, services, and upsells. Here is another example of the user now shifting back over to desktop and then is presented with an ad again. This time the same ad can be for the purposes of support. All within one flow line, the contents of the ad can change based on the story line of the user.

Figure 17:
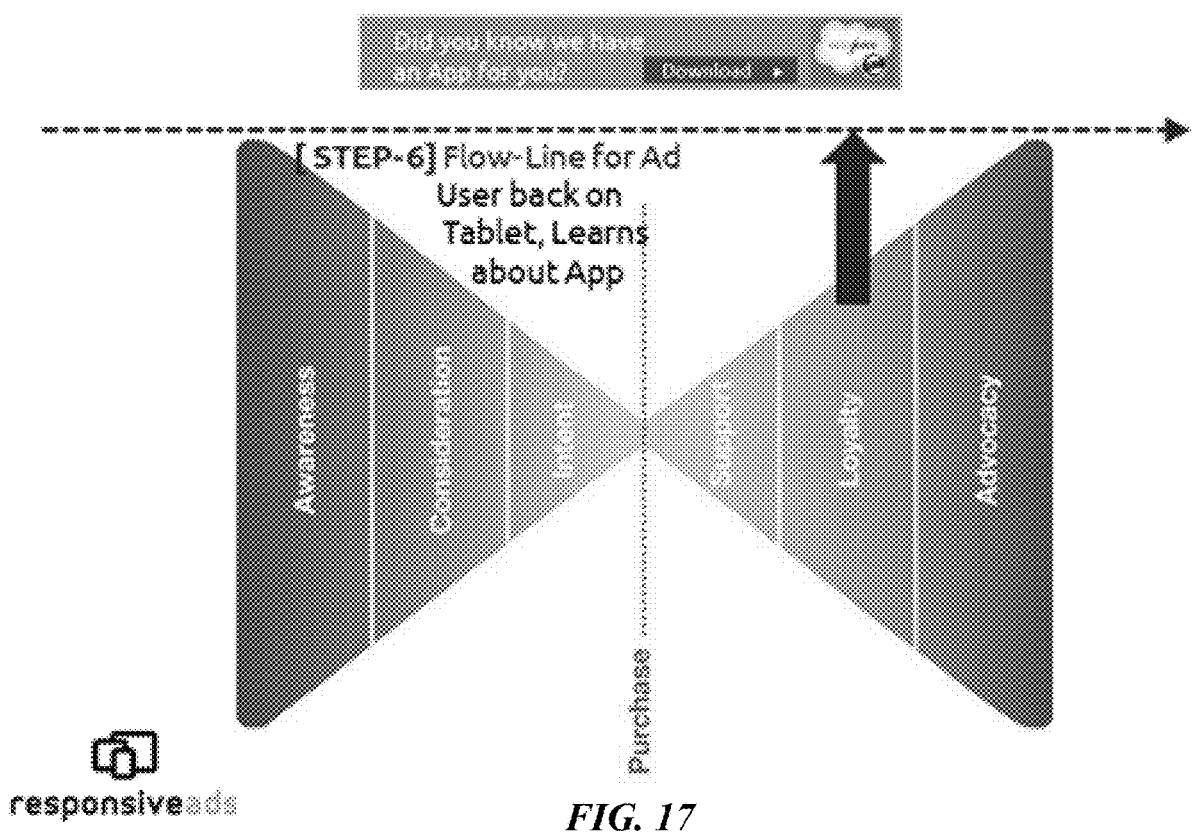
FIG. 17 illustrates a next step of the purchase process, the loyalty step.

FIG. 17 illustrates a next step of the purchase process, the loyalty step. Here is now an example of the advertiser or marketer that knows the user. The user is using the product; they have been active and now are a potential loyalty member. This could be the situation to make the app available. Not only will it save time in running campaigns for Apps to users that are not yet customers, but can have a focused delivery of additional services to that segment with the ad now responding to those users. The example figure is now showing the ad when a user is accessing their mobile device and the ad itself can follow that flow line to have the right message at that time for that particular user or customer.

Figure 18:
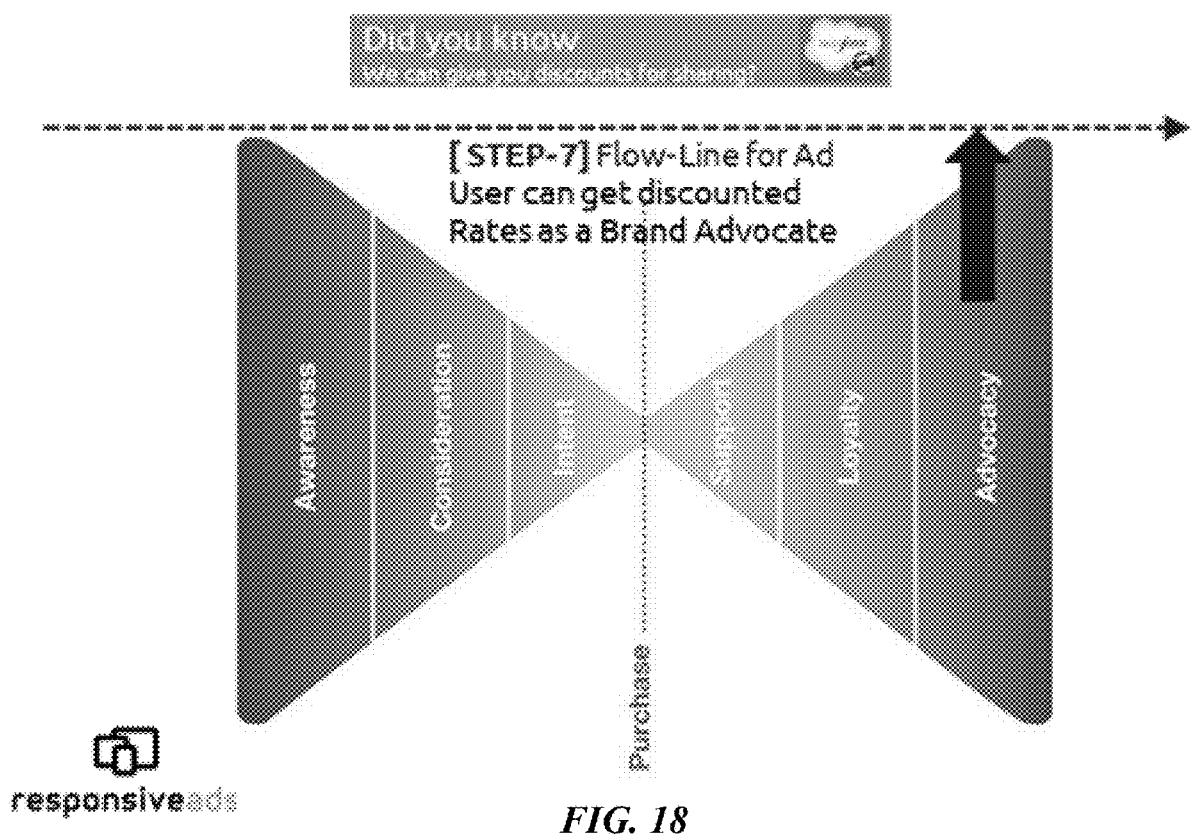
FIG. 18 illustrates a next step of the purchase process, the advocacy step.

FIG. 18 illustrates a next step of the purchase process, the advocacy step. A final step in the purchase process is for customers to generate more customers. Why advertise to customers about a message when they are not customers? It could be very powerful that anytime, anyplace, anywhere a marketer can now actually send messages to the user that tailors to their situation. In this case, an active user of the service of Salesforce (example advertiser) could be rewarded if they become a Brand Advocate. Yes, you could actually inform this to them when they are actually using the product. This illustrates the possibility for the ad to follow that purchase process storyline that is what is configured in the flow line to change the message dynamically.

Figure 19:
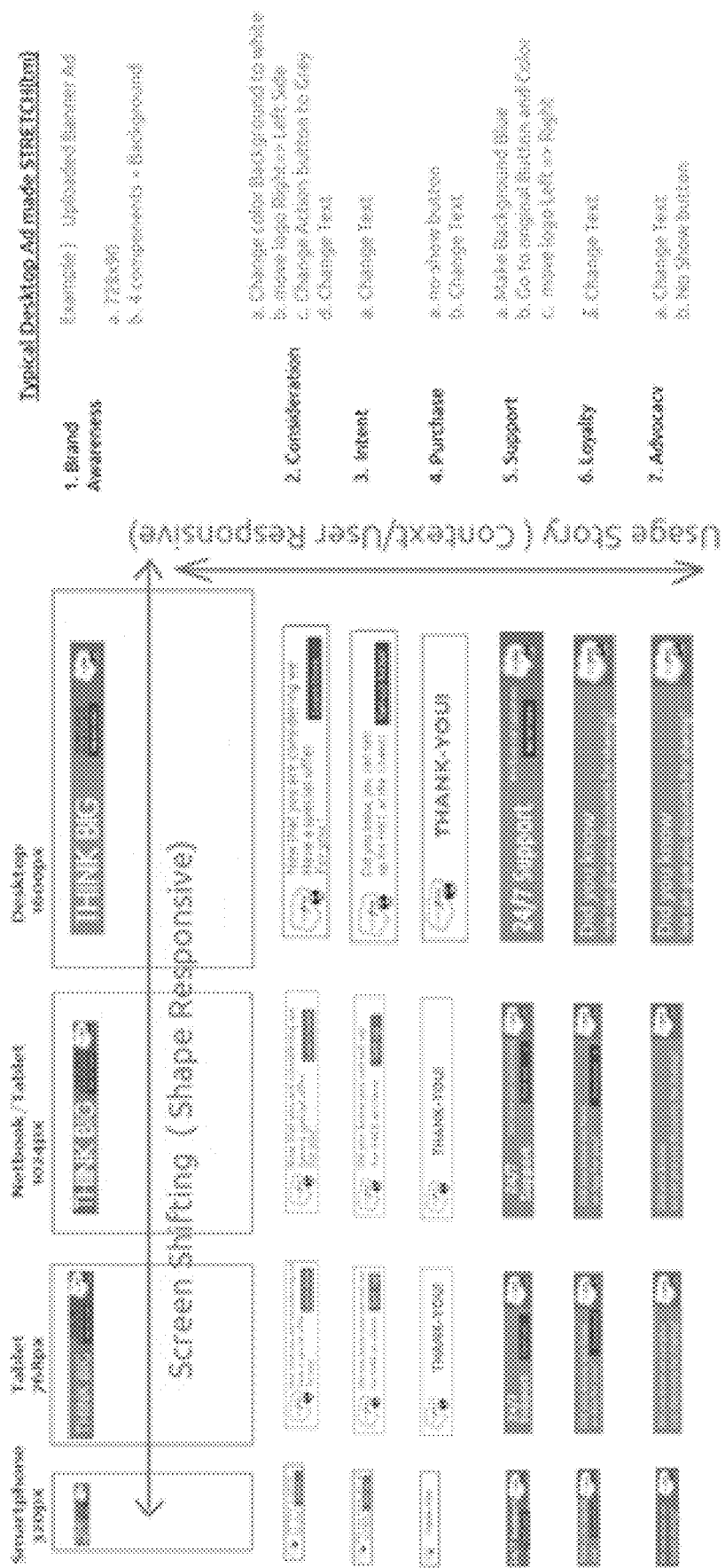
FIG. 19 provides a summary of setting up a flow line for the previous purchase process example.

FIG. 19 provides a summary of setting up a flow line for the previous purchase process example. The figure shows how for the three different responsive mechanisms the flow-line is set-up. Depending on how the user engages, the context, and the shape of the screen, the same ad can dynamically change accordingly. This becomes very powerful. In the traditional process, the advertising operations specialist would need to create 28 different ad creatives and load each of them into the system. Not only does this become a lot of extra work, aligning this so that all of the analytics can be visualized from this one campaign could be a nightmare. By setting up the flow line configuration as such, this can become a very simple process and give the marketer the most amount of flexibility of building out an ad that responds to any of the circumstances in the purchase process.

Figure 20:
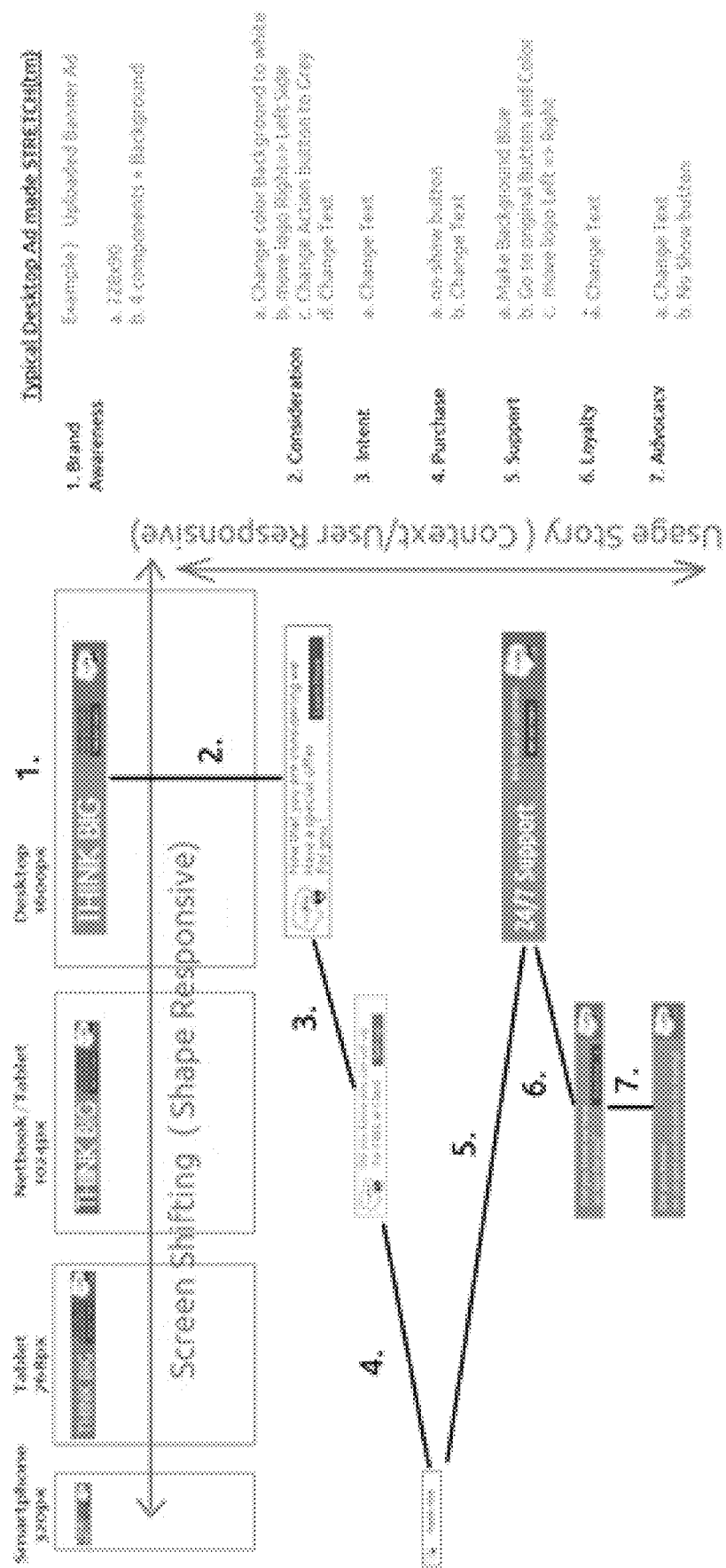
FIG. 20 illustrates the actual path or story line for the particular user in the previous example.

FIG. 20 illustrates the actual path or story line for the particular user in the previous example. Having all of the different scenarios and different shapes of the ads is very powerful for giving good correlation for that ad in an overall campaign process. The seven different scenarios of the purchase funnel are shown again from one to seven.

The following paragraphs describe the flexibility of flow line set up for paid, earned, and owned media. The above example had this set-up for a specific ad example (Sales force) for an ad campaign. However, setting up flow lines is not limited to just this. For example, a publisher could use the technology for house-ads on a site with the technology linked to the overall customer relationship management (CRM) system of the publisher. The different configurations could be set-up across all of the different content pages for a publisher linking to a user. There are also different types of media such as paid (e.g., use media dollars to acquire users), earned (e.g., gain users via blogs or social media), and owned (e.g., marketing to users that are already customers).

The same process could be used for marketing messages on the publisher's website, blog pages, emails linking the actual house ad related to every touch point of that publisher. In the paid scenario, the publisher acts like an advertiser and the ad is very similar to the first four steps of the purchase process described above. The earned scenario could be for a publisher using their own media and blogs and house ads to start the engagement process with that user for these four steps as well. Owned media could be marketing messages that exist from the fourth to seventh steps.

By having a single ad that can do this no matter the device or the place the ad-tag is placed to serve the ad, the responsive advertising system provides a very powerful solution to easily get a holistic view of the overall marketing to the users and customers of a publisher or brand.

The following describes flow line mixes (stretch and swap ad configurations, multiple flow lines, or composite configurations). The responsive advertising system is not just limited to stretch banner ads. A basic version of silo ads for each different screen or campaign has been typically image ads, flash, or HTML5 files. Packaging these files together to deliver for a specific screen, context, or campaign is a traditional way of doing it. Having the stretch technology as a foundation can also provide the ability to use the same tag to deliver these different creatives depending on the configuration of a flow line. Depending on the settings for the triple responsive, the flow line configuration can call these total assets instead of calling individual pieces of the ad to be put together as the ad itself.

Authoring Tools

The following paragraphs describe tools for creating responsive advertisements. When creating a stretch ad or stretch ad combo with swap with a flow line being configured, there are various ways for content and data to be integrated with the actual ad itself. One example is a "Responsive Ad Creator and Dashboard" that can be provided by the system. A Responsive Ad Creator (Ad Configurator) component is one product and technology that has been developed specifically for creating an ad with a flow line. Files can be uploaded from an existing desktop ad. Then, the ad is transformed into a cloud-hosted HTML5 ad. The flow line is built using standard flow lines mentioned above or a custom flow line.

Figure 21:
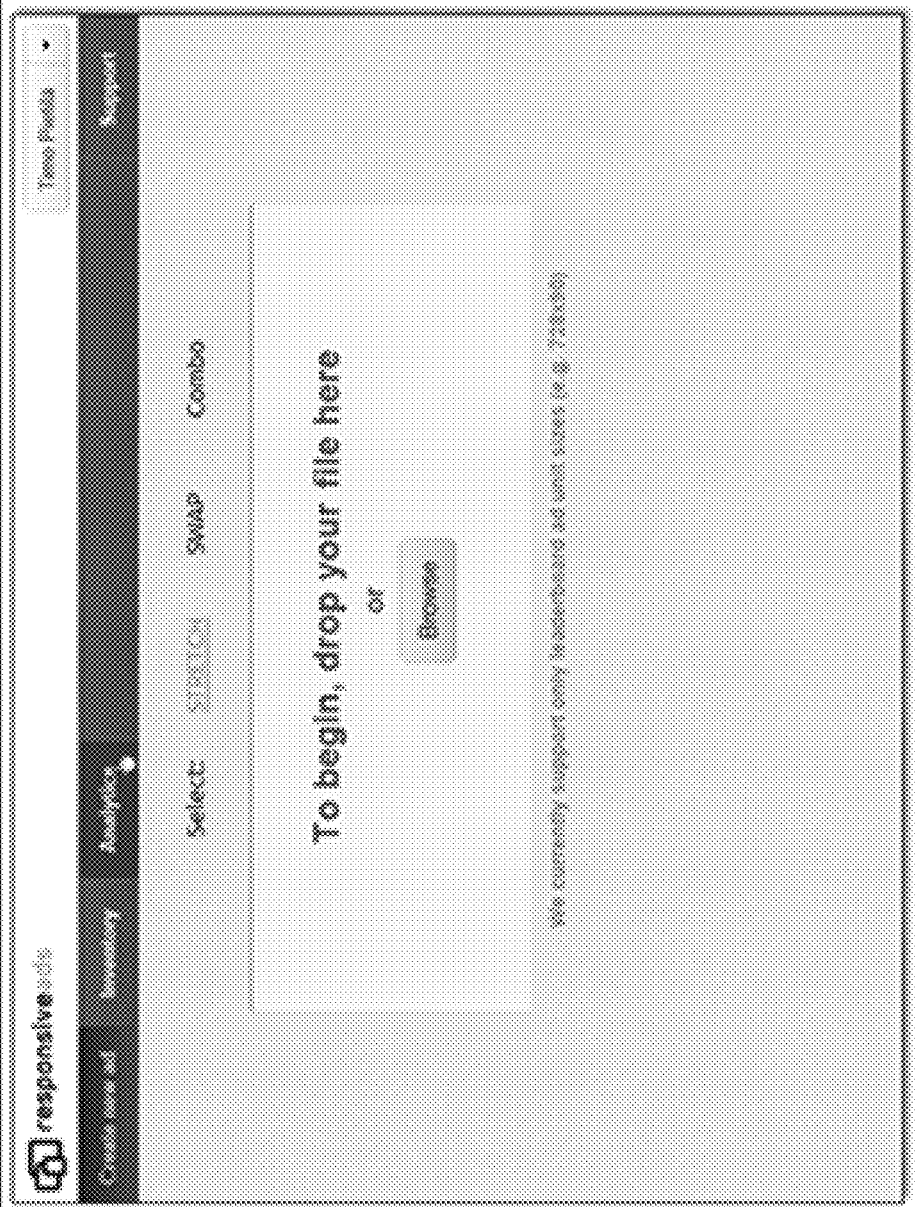
FIG. 21 illustrates a first step of uploading an ad for integration into the responsive advertising process.

FIG. 21 illustrates a first step of uploading an ad for integration into the responsive advertising process. As shown, it is as easy as drag-and-drop of a layered PSD in this case, or also images or even rich media files.

Figure 22:
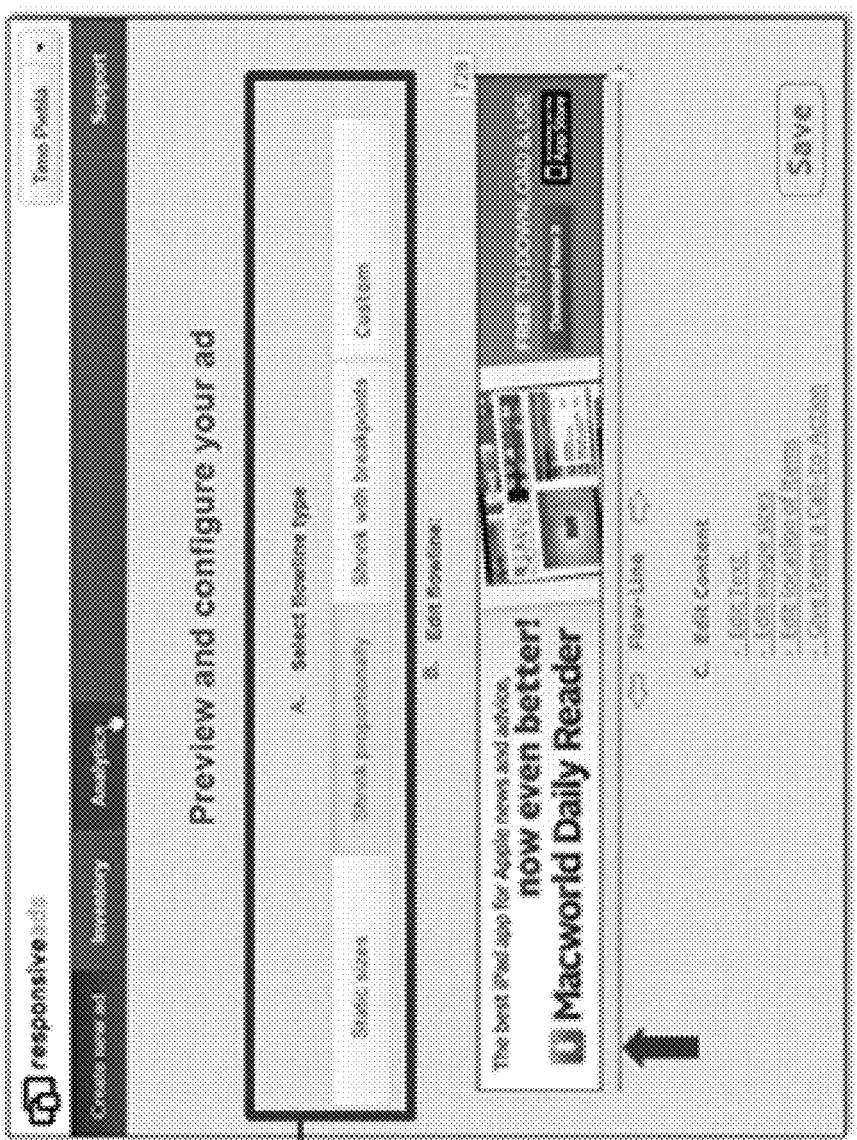
FIG. 22 illustrates a next step of selecting the type of flow line and then editing the ad uploaded.
Figure 22:

FIG. 22 illustrates a next step of selecting the type of flow line and then editing the ad uploaded. As shown, the basic the steps are selecting a flow line, editing the flow line, and editing content. When this is done, the user saves the overall ad with flow line and saves the configuration.

The following grouping of images illustrates how a user of the responsive advertising system can actually edit, based on different breakpoints, the overall ad for the specific views of the flow line being created.

Figure 23:
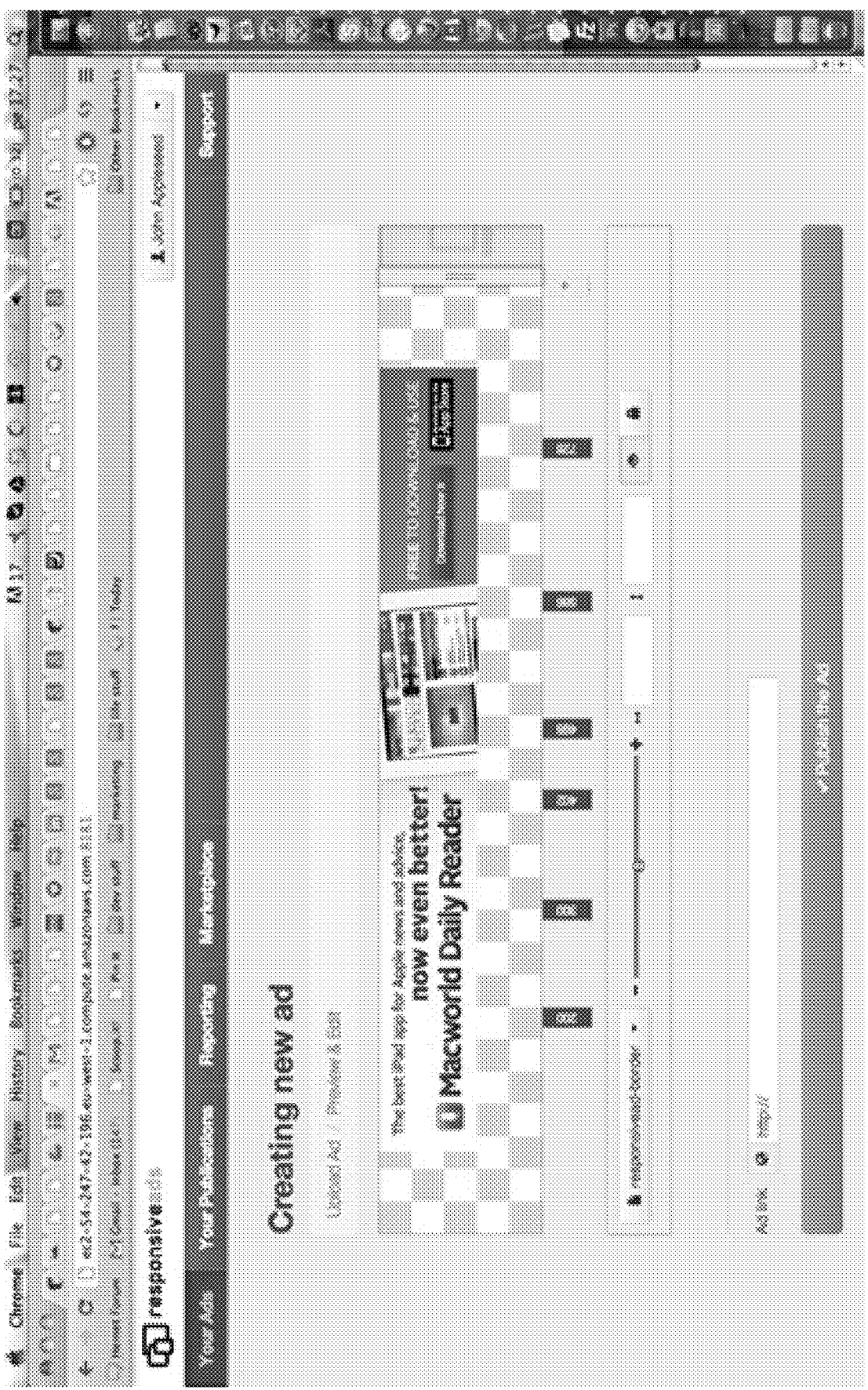
FIG. 23 shows the user creating a new ad.

FIG. 23 shows the user creating a new ad. The black tabs below the ad show where the user wants to have breakpoints where the ad changes shape.

Figure 24:
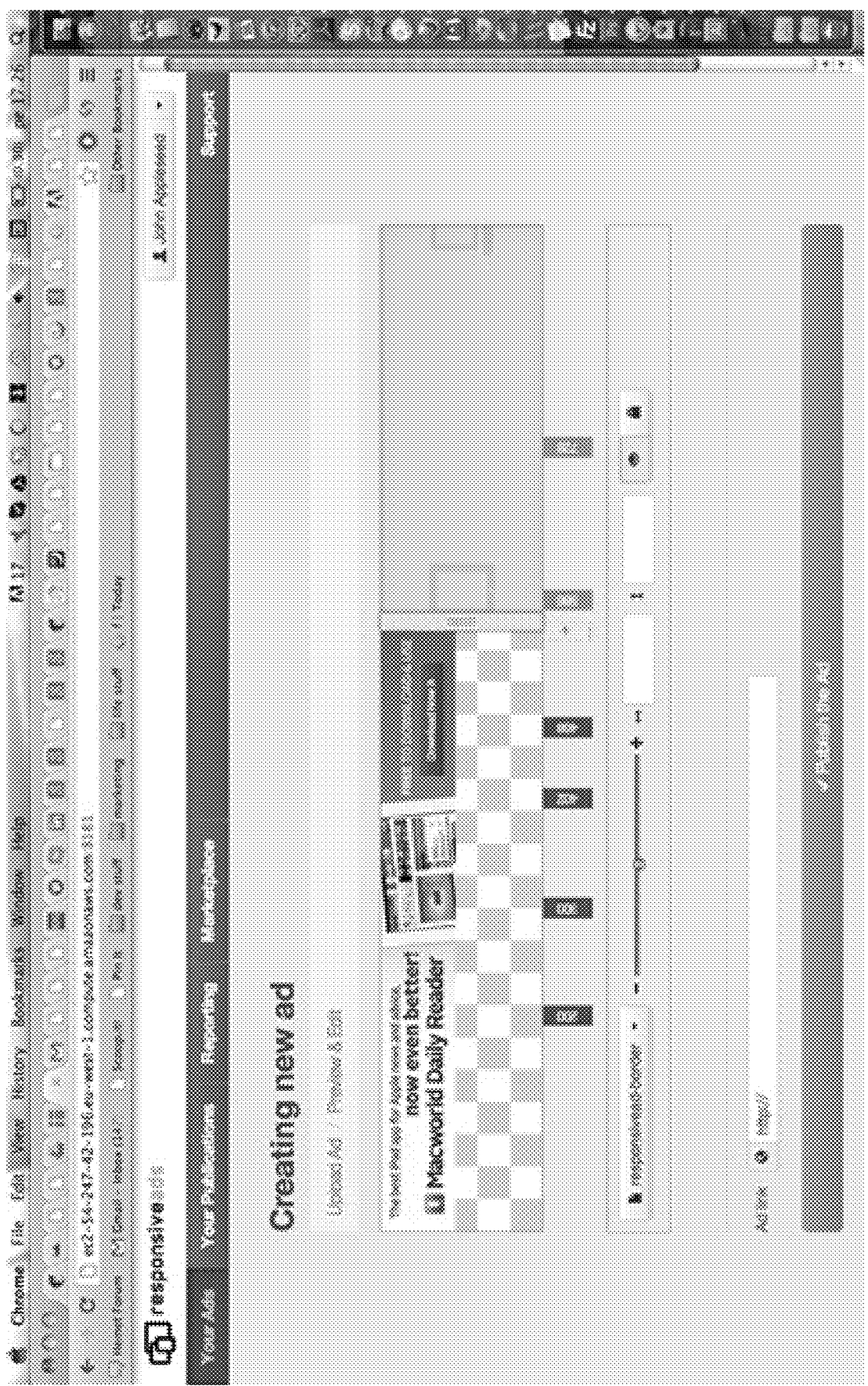
FIG. 24 shows the user with the slider, bringing the ad down to the size of the second breakpoint.

FIG. 24 shows the user with the slider, bringing the ad down to the size of the second breakpoint. The elements in the ad can be selected for editing.

Figure 25:
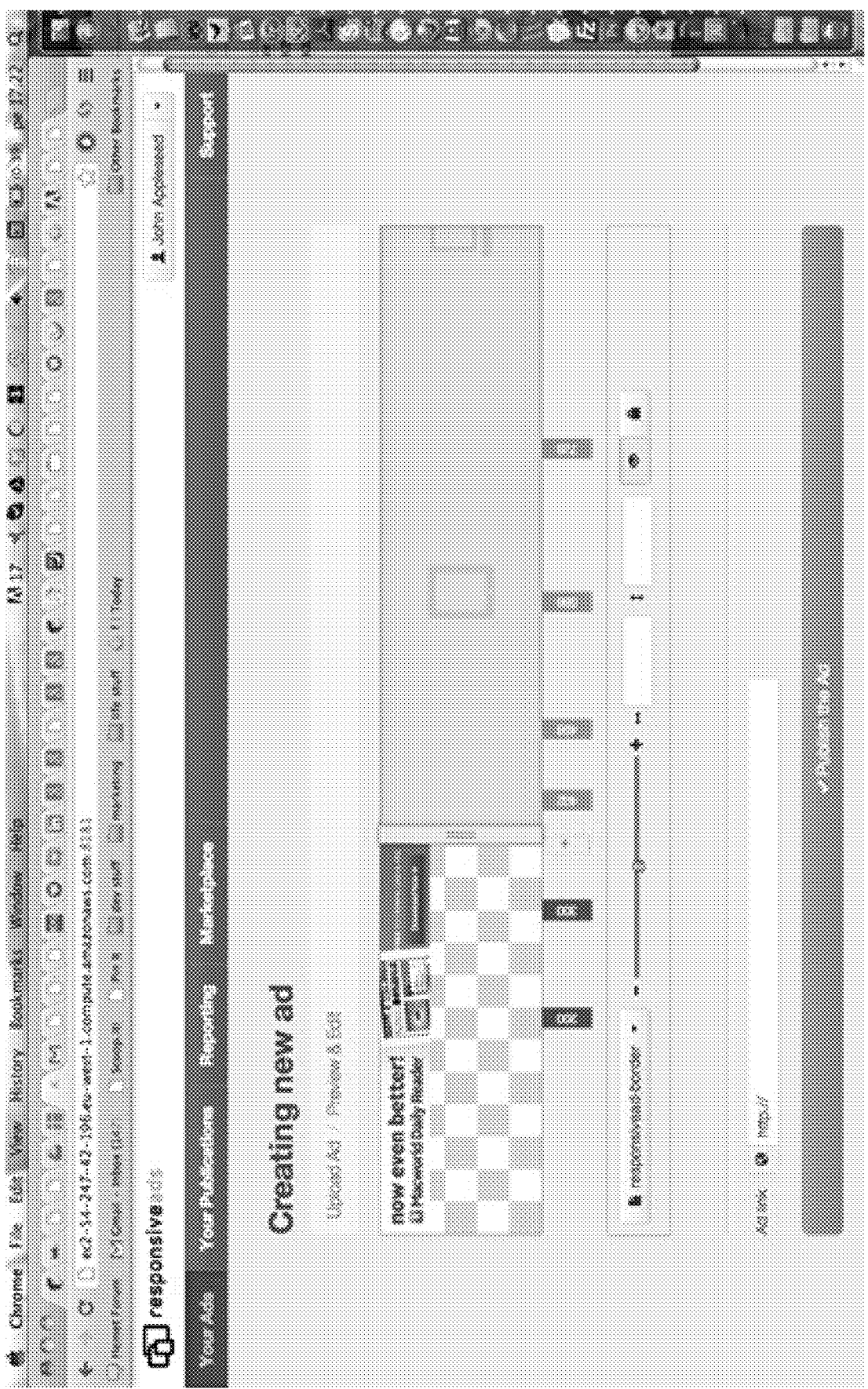
FIG. 25 shows an image of the ad when it is at the fourth breakpoint.

FIG. 25 shows an image of the ad when it is at the fourth breakpoint. This will define a different view of the flow line. As shown, there were elements that were turned off, repositioned, and much made a bit larger. The responsive advertising system provides the ability to turn-on and off all kinds of dynamic features.

The data used and provided by the system to connect and correlate data for users is a strength of the responsive advertising system. This topic was discussed earlier and even though the system is not pertaining to cross-platform cookies or universal log-ins of the ad for users, the ability to aggregate information about a user and segment and link this to each of the different views of the flow line is possible and will become a business strength of the product. This is achieved via an API of the system linking to the different data sources or publisher subscriber or user databases for the sites where the ads are present.

The storyline approach can be achieved as well as the process of aggregating cookies for each specific platform in a sequential manner to be able to build out that storyline. For instance, a user may view or interface with the desktop ad. A cookie is then deployed on that user's device. When the user interacts a second time, a follow-up to that cookie is deployed indicating that the user has interacted twice with a certain intent or with the context and behavior that surrounded that interaction. The same thing could be repeated on another device so that there are multiple cookies or the aggregate indication that the user has been going down that storyline process. In this case, the two different clusters of cookies or tracking enablers are disconnected from device to device. Techniques to connect the user are known in the art, and with the connection made, the two clusters or three different clusters for the different screens can then be connected to get the bigger picture of the overall interactions across the different screens leading to the full storyline. An analogy is that each cluster can be thought of as a chapter making up the entire storyline that is a book when the chapters are connected.

Matching Publishers and Advertisers

One of the biggest challenges with the responsive advertising system is the ability for both publishers and advertisers to agree on a flow line. Publishers set-up their site to be able to handle flow lines and then need the advertisers to match that flow line.

Figure 26:
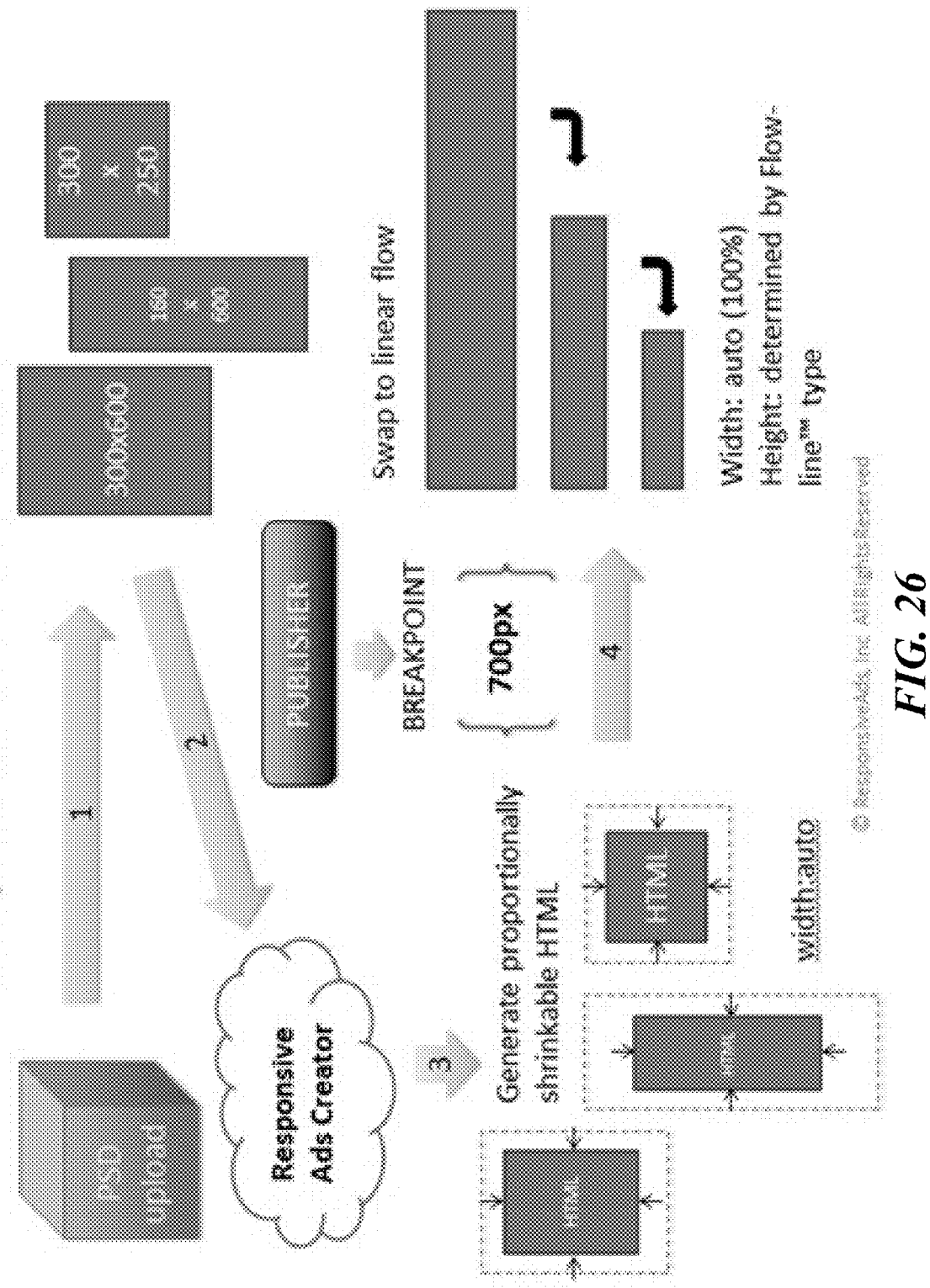
FIG. 26 illustrates the relationship between the publisher and advertiser in the scheme of determining a flow-line that also will relate to the approval process.

FIG. 26 illustrates the relationship between the publisher and advertiser in the scheme of determining a flow-line that also will relate to the approval process. This diagram is showing the Responsive Ads Creator and the basic steps as described above in formulating an ad and a product. For all devices, the system makes it simple to provide a breakpoint where the shape of the advertisement is selected and determined.

In some embodiments, the responsive advertising system provides a marketplace for publishers and advertisers. The concept is similar to a playlist of several ads on a page that flows from page to page.

Figure 27:
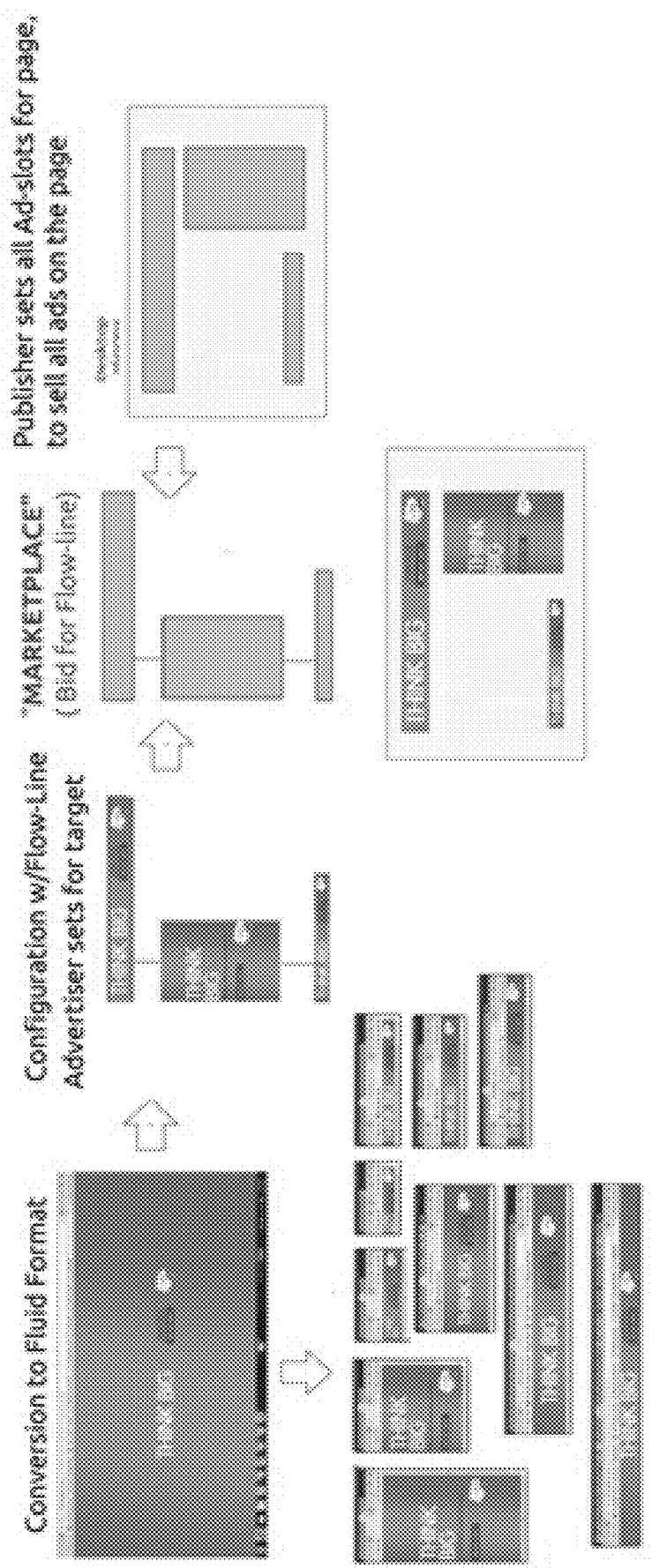
FIG. 27 illustrates that once there is a process for flow lines for the responsive shape of the flow line, publishers and advertisers can potentially buy and sell these overall formats.

FIG. 27 illustrates that once there is a process for flow lines for the responsive shape of the flow line, publishers and advertisers can potentially buy and sell these overall formats. In this figure, an advertiser could buy all of the ads on one section of a site, which could be configured with the flow line with each different ad slot being defined by the publisher.

Figure 28:
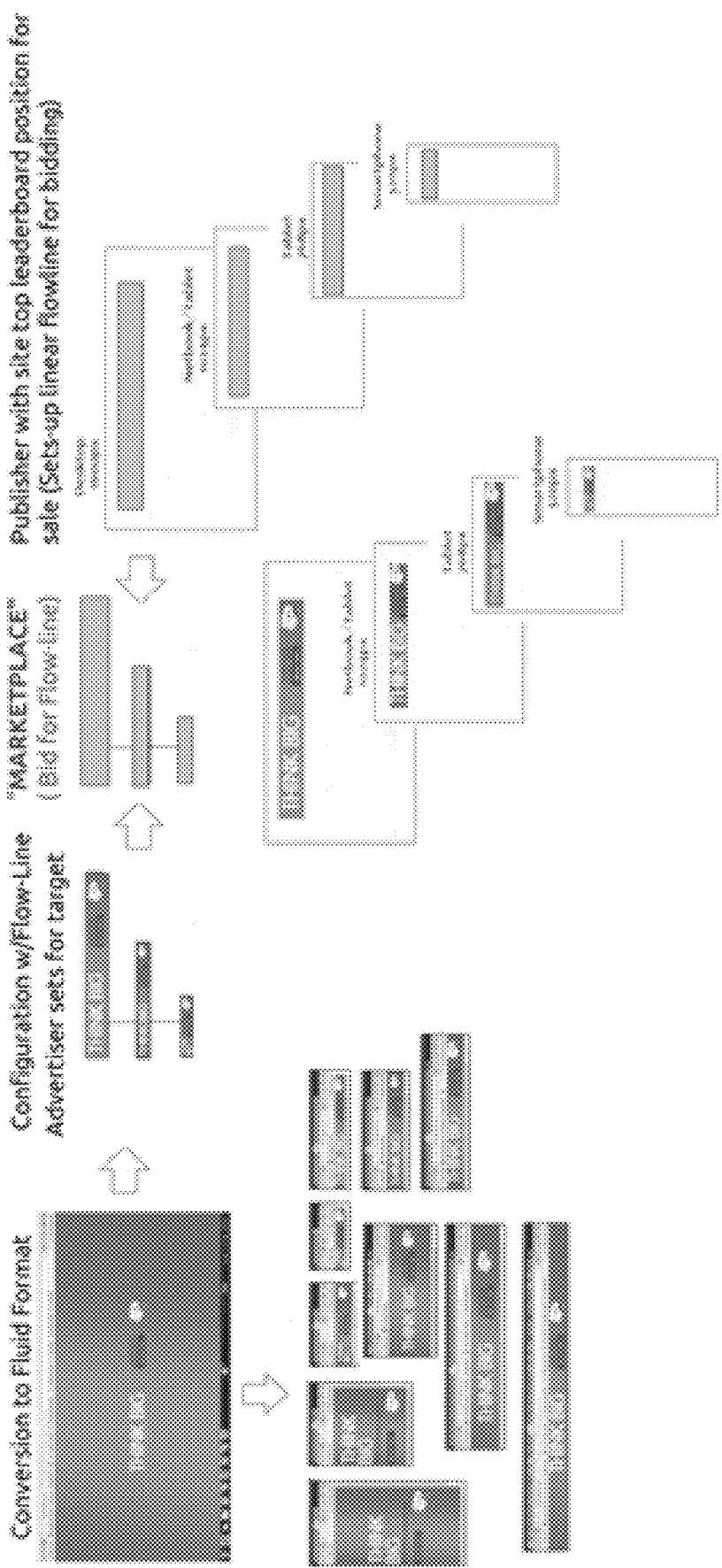
FIG. 28 shows an example where an advertiser could also potentially purchase a set-position on a site defined by the publisher.

FIG. 28 shows an example where an advertiser could also potentially purchase a set-position on a site defined by the publisher.

Figure 29:
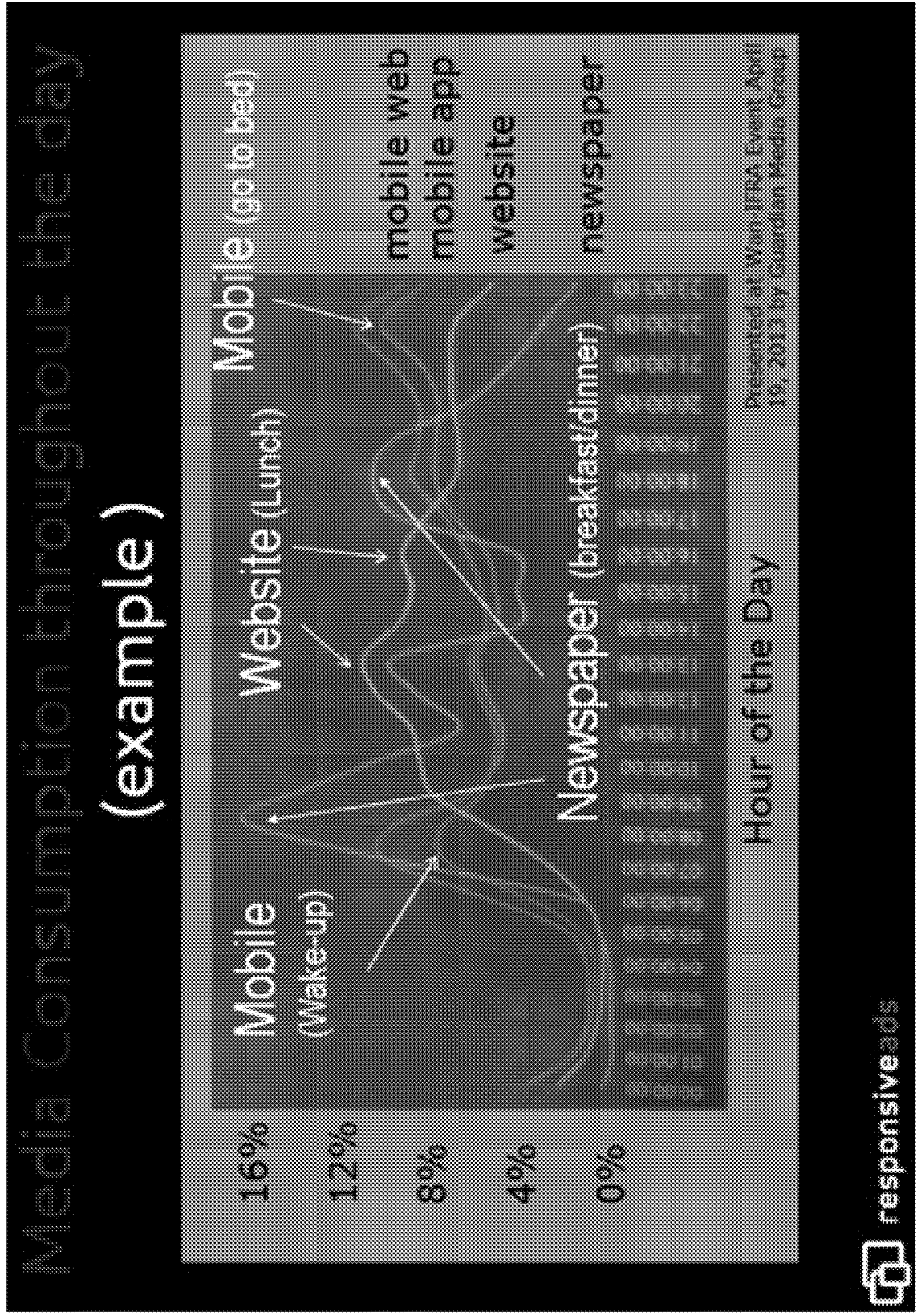
FIG. 29 shows recent data about how users screen shift throughout the day.

FIG. 29 shows recent data about how users screen shift throughout the day. The same user will use multiple devices for different times of the day. In this example, the data comes from how users visit the Guardian's website to read the news.

The flow line to incorporate the triple response in this kind of story line strategy is very powerful for giving a very solid model for attribution from screen to screen or cross-screen or screen shifting to have the most relevant usage of ads throughout a publisher's properties. It was discussed in the marketplace discussion of linking the storyline ads as a flow line to the flow line of the publisher. This process can evolve where the ad flow line can evolve to be very synergistic with the editorial content of the site for matched consumption of advertising content. This gives a very solid foundation of advertising that is embedded in the site and appears more like sponsorship rather than interrupted adverting though out the site.

From the foregoing, it will be appreciated that specific embodiments of the system have been described herein for purposes of illustration, but that various modifications may be made without deviating from the spirit and scope of the invention. Accordingly, the invention is not limited except as by the appended claims.

I claim:
1. A method comprising:
receiving a first request, at a server computer, from a first client device to access a dynamically adjustable and fluidly adjustable advertisement, wherein a height and a width of the advertisement are adjustable to any size, to display on the first client device based on a profile of a user, and first client device information included in the first request, wherein the first client device information includes at least one characteristic of the first client device or at least one parameter of a first application, wherein the first client device differs from a second client device in the at least one screen dimension, and wherein the dynamically adjustable and fluidly adjustable advertisement adjusts size fluidly depending on at least one screen dimension of a client device or at least one parameter of an application on which the dynamically adjustable and fluidly adjustable advertisement is configured to be displayed, or at least one adjustment by the user;

identifying, at the server computer, the user profile that initiated the first request;

identifying, at the server computer, the at least one characteristic of the first client device or the at least one parameter of the first application, wherein the at least one characteristic including a first at least one screen dimension of the first client device or the at least one parameter including a first at least one display dimension of the first application;

determining, at the server computer, upon receiving the first request from the first client device, a first dynamic display format and first elements to serve to the first client device as the dynamically adjustable and fluidly adjustable advertisement, wherein the elements include at least a first image data and at least a first text data and wherein a size of a first image configured for displaying at the first client device from the first image data and a size of the first text configured for displaying at the first client device from the first text data are dynamically adjustable, and wherein the size of the first image and the size of the first text are fluidly adjustable;

generating at the server computer the dynamically adjustable and fluidly adjustable advertisement, based on the determining, and serving the dynamically adjustable and fluidly adjustable advertisement to the first client device;

receiving a second request, at the server computer, from the second client device to access the dynamically adjustable and fluidly adjustable advertisement to display on the second client device based on the user profile and on second client device information included in the second request, wherein the second client device information includes at least one characteristic of the second client device or at least one parameter of a second application;

identifying, at the server computer, the at least one characteristic of the second client device or the at least one parameter of the second application, wherein the at least one characteristic including a second at least one screen dimension of the second client device or the at least one parameter including a second at least one display dimension of the second application;

determining, at the server computer, a second dynamic display format and second elements to serve to the second client device as the dynamically adjustable and fluidly adjustable advertisement based on the second at least one screen dimension of the second client device or the second at least one display dimension of the second application;

automatically and dynamically adjusting at the server computer the dynamically adjustable and fluidly adjustable advertisement that was served to the first client device, including a size of the first image configured to be displayed at the second client device from the first image data and a size of the first text configured to be displayed at the second client device from the first text data such that the dynamically adjustable and fluidly adjustable advertisement is automatically adjusted to a second size based on the determining; and serving to the second client device via the server computer the adjusted format of the same dynamically adjustable and fluidly adjustable advertisement that was served to the first client device, including the first image data and the first text data, based on the second at least one screen dimension of the second client device or the second at least one display dimension of the second application and continuing from a point in an advertisement rendering at which the user transitions from the first client device to the second client device.

2. The method of claim 1, wherein the information is a first information, wherein receiving the first request from the first client comprises receiving, by the server, a second information identifying which advertisement the first client device is requesting, a user agent tag associated with the first client device, and the first information.

3. The method of claim 1, wherein the information is a first information, wherein identifying the user profile does not include the use of personally identifiable information (PII), but includes the use of a second information sufficient to distinguish the user profile from other user profiles.

4. The method of claim 1, wherein the information is a first information, wherein identifying the user profile comprises requesting a second information from the Internet property to identify the user based on the user profile stored by the Internet property.

5. The method of claim 1, wherein identifying at least one characteristic of the first client device comprises determining whether the first client device supports a particular plugin for running an applet for that plugin with an advertisement.

6. The method of claim 1, wherein determining a first dynamic display format and elements comprises selecting from one or more images and texts comprising an advertising unit defined by an advertisement author using an authoring tool.

7. The method of claim 1, wherein determining the parameters of the first dynamic display format and elements of the dynamically adjustable and fluidly adjustable advertisement comprises adjusting a flexible advertising unit, a size and a position of the first image and a size and a position of the first text to adapt the dynamically adjustable and fluidly adjustable advertisement to the at least one characteristic of the first client device.

8. The method of claim 1, wherein determining the parameters of the first dynamic display format, the first image, and the first text of the dynamically adjustable and fluidly adjustable advertisement comprises applying present state information based on the user profile and the at least one characteristic of the first client device to dynamically and fluidly adjust the first display format, a size and a position of the first image, and a size and a position of the first text of the dynamically adjustable and fluidly adjustable advertisement to respond in a way specified by an advertisement author.

9. The method of claim 1, wherein each of the first dynamic display format and the second dynamic display format is not an upconversion or downconversion scaling of the dynamically adjustable and fluidly adjustable advertisement.

10. The method of claim 1, further comprising the server computer configuring the dynamically adjustable and fluidly adjustable advertisement as a single version of an adjustable advertising unit.

11. The method of claim 10, further comprising the server computer configuring the advertising unit to change in real time based on a set of predetermined rules.

12. The method of claim 1, further comprising adjusting the content of the dynamically adjustable and fluidly adjustable advertisement using a flow line.

13. The method of claim 12, further comprising adjusting the content of the dynamically adjustable and fluidly adjustable advertisement based on a context.

14. The method of claim 12, wherein adjusting comprises at least one of configuring, modifying, or reformatting.

15. The method of claim 12, further comprising adjusting the content of the dynamically adjustable and fluidly adjustable advertisement without changing ad server tags.

16. The method of claim 1, wherein the dynamically adjustable and fluidly adjustable advertisement is rendered as an ad footprint.

17. The method of claim 16, wherein at least one dimension of the ad footprint is adjusted based on the size and shape of a browser viewport.

18. The method of claim 1, wherein a size of the first image and a size of the first text is determined based on a breakpoint.

* * * * *